US012724167B2

(12) United States Patent
Leininger

(10) Patent No.: US 12,724,167 B2
(45) Date of Patent: Sep. 1, 2026

(54) SYSTEM AND METHOD FOR UXO DETECTION

(71) Applicant: Tobias Leininger, Waakirchen (DE)

(72) Inventor: Tobias Leininger, Waakirchen (DE)

(73) Assignee: ArroTech Corp., Panama City Beach, FL (US)

( * ) Notice: Subject to any disclaimer, the term of this patent is extended or adjusted under 35 U.S.C. 154(b) by 83 days.

(21) Appl. No.: 18/800,015

(22) Filed: Aug. 10, 2024

(65) Prior Publication Data

US 2025/0060504 A1 Feb. 20, 2025

Related U.S. Application Data

(60) Provisional application No. 63/532,788, filed on Aug. 15, 2023.

(51) Int. Cl.

| | |
|---|---|
| ***G01V 3/16*** | (2006.01) |
| ***B64F 5/10*** | (2017.01) |
| ***B64U 20/83*** | (2023.01) |
| ***B64U 101/15*** | (2023.01) |
| ***F42D 5/02*** | (2006.01) |
| ***G01S 19/43*** | (2010.01) |
| ***G01V 3/08*** | (2006.01) |
| ***G01V 3/165*** | (2006.01) |

(52) U.S. Cl.

CPC .................. *G01V 3/16* (2013.01); *B64F 5/10* (2017.01); *B64U 20/83* (2023.01); *F42D 5/02* (2013.01); *G01S 19/43* (2013.01); *G01V 3/08* (2013.01); *G01V 3/165* (2013.01); *B64U 2101/15* (2023.01)

(58) Field of Classification Search

CPC .. G01V 3/16; G01V 3/08; G01V 3/165; B64F 5/10; B64U 20/83; B64U 2101/15; F42D 5/02; G01S 19/43

See application file for complete search history.

(56) References Cited

U.S. PATENT DOCUMENTS

| | | | | |
|---|---|---|---|---|
| 2016/0359986 | A1* | 12/2016 | Jones | G06F 16/29 |
| 2020/0011961 | A1* | 1/2020 | Hill | G01S 5/0247 |
| 2020/0393593 | A1* | 12/2020 | Qian | G01V 3/16 |
| 2021/0160781 | A1* | 5/2021 | Dondoneau | H04W 52/0235 |
| 2024/0015690 | A1* | 1/2024 | Bridges | H04L 5/0048 |
| 2024/0134085 | A1* | 4/2024 | Lathrop | G06N 3/04 |

* cited by examiner

*Primary Examiner* — Scott A Browne
*Assistant Examiner* — Izcalli Rios-Aguirre
(74) *Attorney, Agent, or Firm* — FYPA.legal; Chris Tanner

(57) ABSTRACT

A system and method for detecting unexploded ordnance (UXO) is disclosed. The system combines a customized Unmanned Aerial Vehicle (UAV) with a ground control station, and flies above terrain with centimeter precision using onboard LIDAR, SONAR, and RADAR sensors at altitudes as low as 20 cm. The system also provides several methods for mission planning including numerous Graphical User Interfaces (GUIs) for tablets and smartphones. The system provides obstacle avoidance and non-geometric area mapping. The data is fully compatible with numerous geophysical software formats and enables the UAV capable of precisely following real world terrain at distances as close as 20 cm, and is able to avoid obstacles in its flight path.

13 Claims, 19 Drawing Sheets

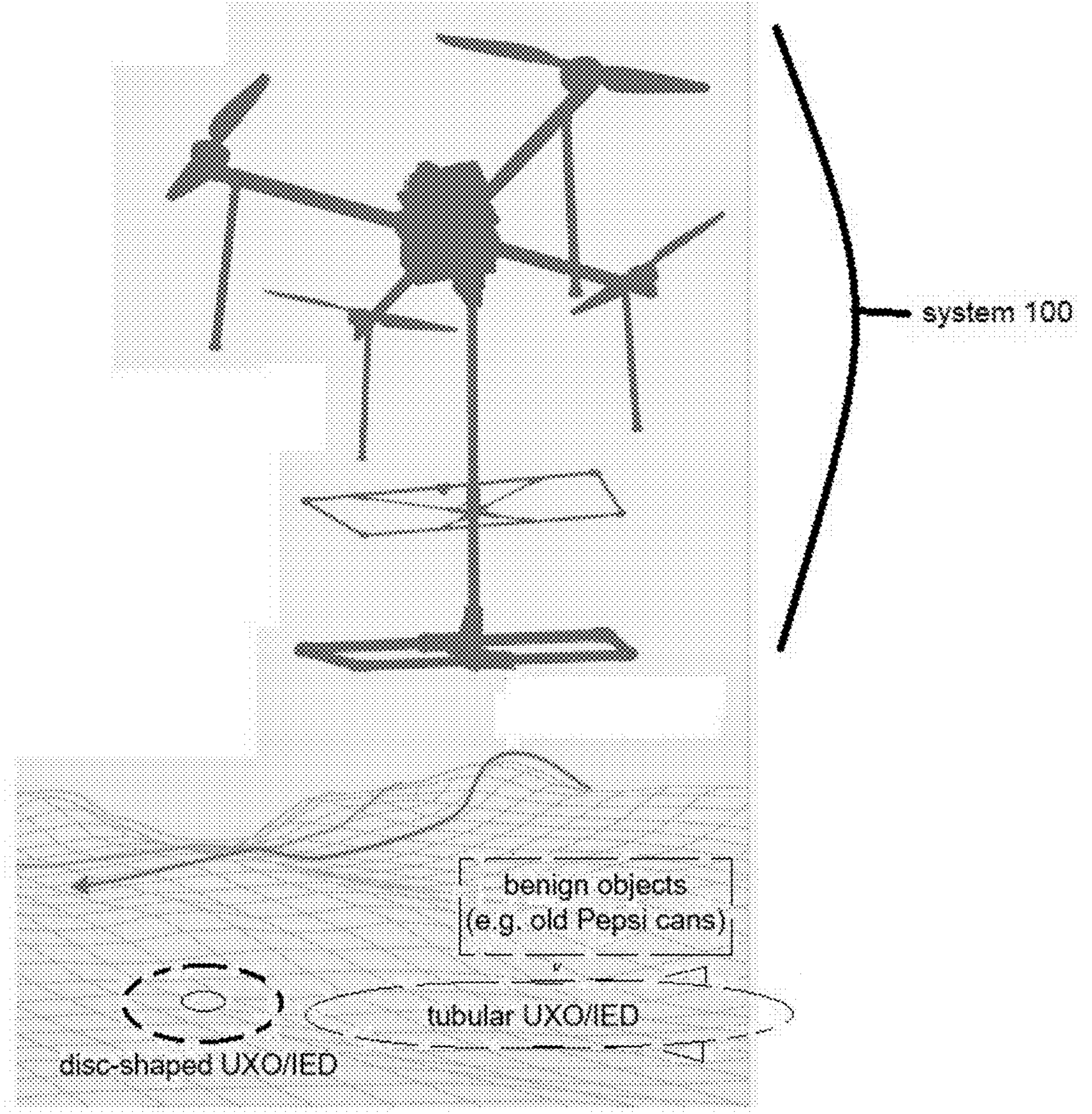
FIG. 1C (uneven terrain)

SYSTEM AND METHOD FOR UXO DETECTION

BACKGROUND OF THE INVENTION

Unexploded Ordnance (UXO) is a serious problem and threat to public safety. Unfortunately, UXO is very dangerous and difficult to detect and remove. Consequently, an improved mechanism for detecting and removing UXO is desired.

SUMMARY OF THE INVENTION

- Combines a customized UAV with a ground control station;
- Fully integrates military-grade metal detection capability;
- Flies terrain with centimeter precision using onboard LIDAR, SONAR, and RADAR sensors at altitudes as low as 20 cm;
- Utilizes time domain metal detection (including non-ferromagnetic items);
- Exact RTK GPS pinpoint location of targets within centimeters;
- Mission Planning GUIs for tablets and smartphones;
- Autonomous return and resume for battery changes (capable of mapping 10,000 square feet in 20 minutes);
- Obstacle avoidance and non-geometric area mapping;
- Live data transmission to ground control station;
- Data is fully compatible with numerous geophysical software formats; and
- Uniquely designed to control electromagnetic noise thus resulting in increased detection\visibility of targets e.g. UXO, other.

The embodiments herein utilize an autonomous UAV incorporating a custom time-domain metal detector, and is fully compatible with standard tools for UXO and mine detection. For the system to work effectively, maintaining a stable distance of UAV from ground is crucial. This feature leads to increased accuracy of the detector. The system is capable of precisely following real world terrain at distances as close as 20 cm, and is able to avoid obstacles in its flight path.

The system also cuts down UXO-survey times to a fraction of time needed for conventional survey methods currently being used for UXO and mine detection. Further, the system achieves this while improving accuracy, safety and cost effectiveness.

BRIEF DESCRIPTION OF THE DRAWINGS

FIG. 1C shows a UAV flying a planned mission while precisely following the ground-contour;

DETAILED DESCRIPTION OF THE PREFERRED EMBODIMENTS

Semantics

This disclosure will occasionally refer to MAVLINK protocols. Many but not all UAVs use MAVLINK protocols, packet formats, message formats. While the embodiments here strive to remain fully MAVLINK compatible, these embodiments also at times use the MAVLINK protocols as a base-platform but where they extend far beyond anything MAVLINK protocols intended. This results in customization and extended amounts of features and usages for the embodiments herein. Further, other protocols used to communicate with a UAV (drone) other than MAVLINK may also be used herein. This concludes the discussion of semantics.

Figure 1A:
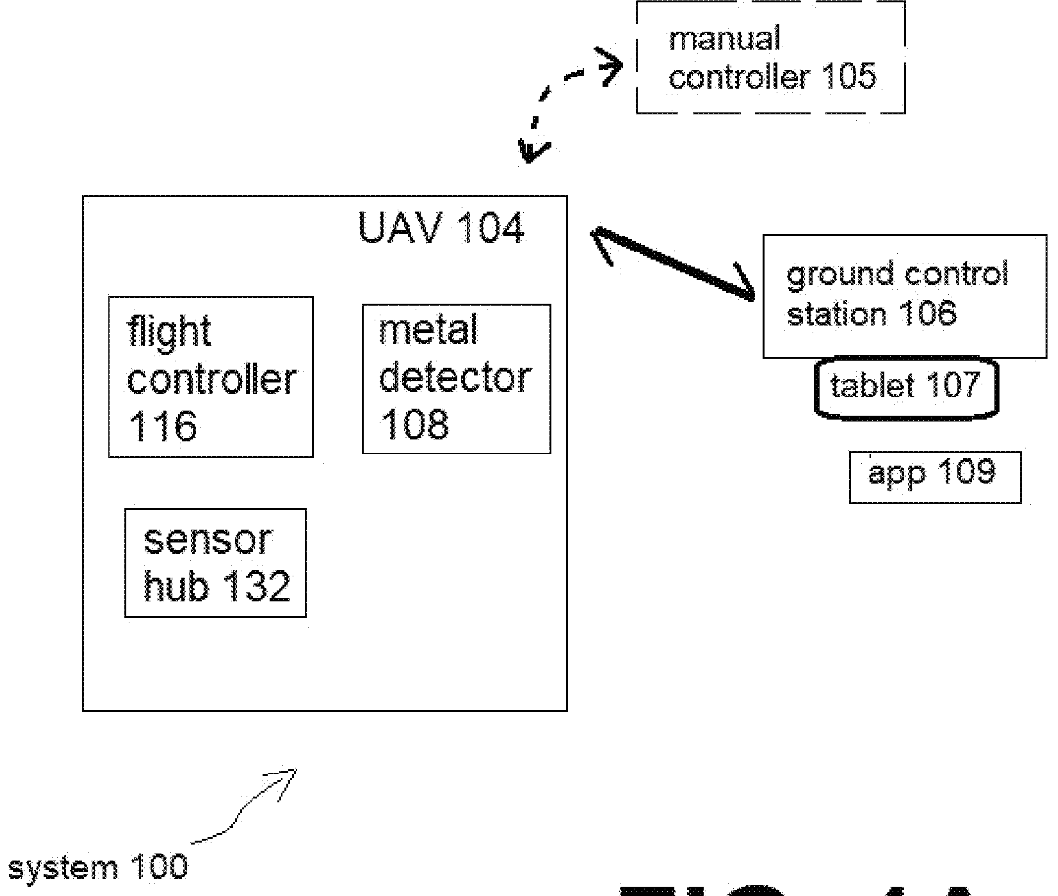
FIG. 1A shows an example system for detecting and mapping Unexploded Ordnance (UXO) data.

FIG. 1A shows an example system 100 for detecting and mapping Unexploded Ordnance (UXO) data. This data is helpful in de-mining the various UXO, and doing so in a way which greatly reduces risk on the workers tasked with the de-mining operation. De-mining is an extremely hazardous task and has many dangers.

The system 100 assesses and captures UXO data within specific areas of land combines a ground control system (GCS) 106 with a specially-configured unmanned aerial vehicle (UAV) 104. The UAV 104 has many components, not all of which are overtly stated herein. However, three elements are a flight controller 106, a metal detector 108, and a sensor hub 132.

This disclosure and claims are focused on the GCS 106, but even with that focus, it is still necessary to discuss the UAV 104 to some extent.

The ground control station 106 also has many elements, but FIG. 1A shows a skeletal summary overview including a tablet 107, an app 109 loaded onto the tablet 107. In the event the tablet 107 fails in some way, a backup manual controller 105 can help bring the system 100 back under control. The manual controller has its own communication link directly from the controller to the drone, bypassing the GCS 106 if necessary. The manual controller 105 can be used in the case the tablet fails, the GCS 106 fails, or the communication between GCS 106 and UAV 104 is blocked.

Within the embodiments herein, the GCS 106 controls everything, the whole flight of the UAV 104. The UAV 104 doesn't control many variables. While the UAV 104 is responsive to human interaction, that is typically done through the GCS 106. There is almost no direct human-to-UAV interaction.

The GCS 106 controls the UAV 104, and guides it in obtaining the most optimal information available on potential UXO in an area defined by a user. The GCS 106 assists the user in defining boundaries that can be searched for UXO.

Figure 1B:
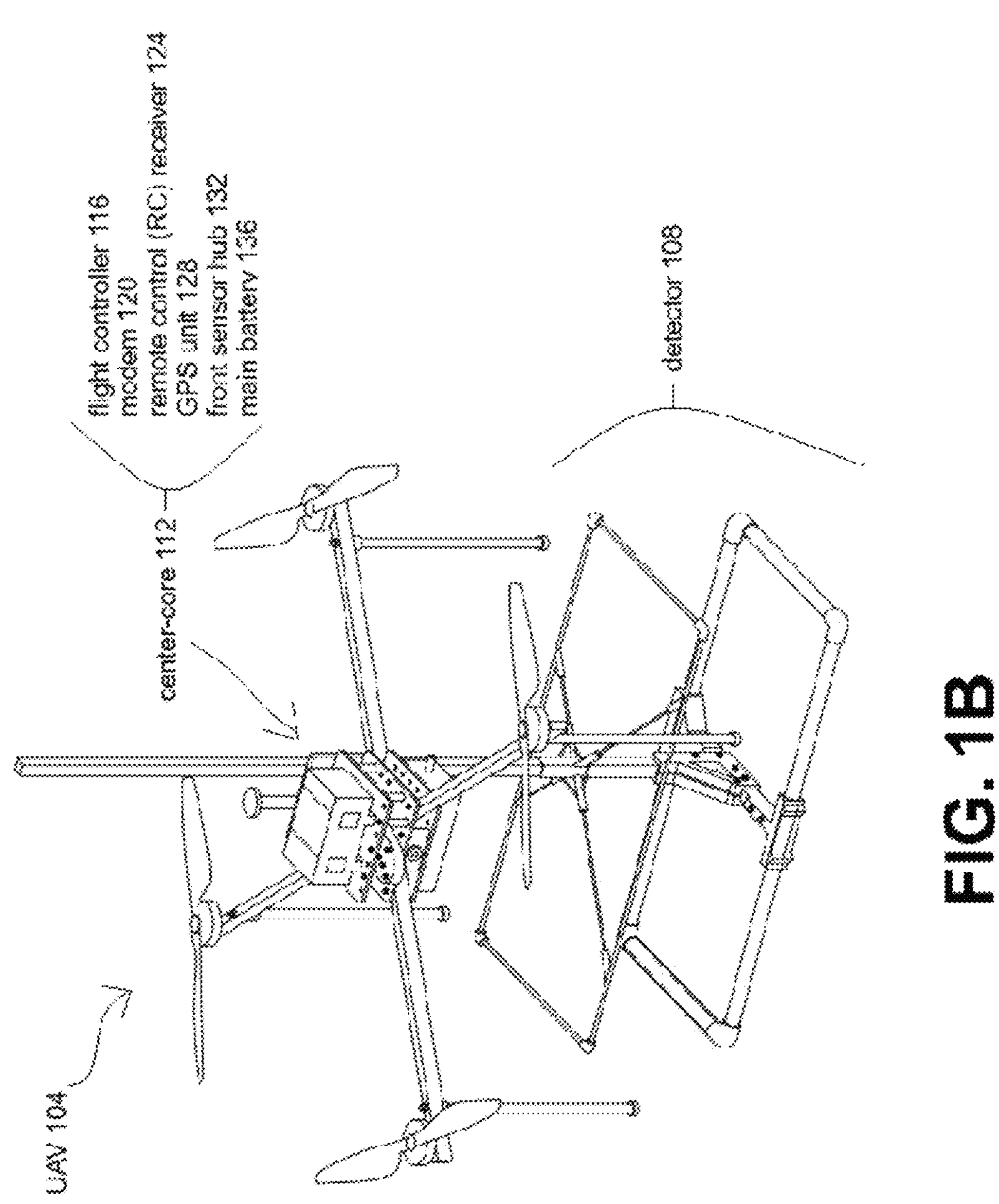
FIG. 1B shows more detail of the UAV.

More detail of the UAV 104 is shown in FIG. 1B. The UAV 104 comprises a metal detector 108, and a center-core 112. Within the center-core 112 are a flight controller (FC) 116, an RFD modem 120, a remote control (RC) receiver 124, a GPS unit 128 (GPS is mentioned for convenient reference, but this unit 128 also accommodates GNSS, and RTK), a front sensor hub 132, and a main battery 136.

One possible non-limiting way of operating the system 100 is as follows. A UXO-detection mission is planned using a drone control app (not shown) located on the tablet 107. The UAV 104 then flies that planned mission while precisely following the ground-contour and simultaneously flagging UXO/IED/EROW information, as shown in FIG. 1C. After that mission is completed, the UAV 104 flies back to a predetermined (but changeable) "home" location and lands (verb) onto the ground. At that time, a human operator can either start a new mission, or continue an existing mission by changing out the battery packs and proceeding from where the mission left off.

Once a mission is completed, the data is automatically transferred to a storage device (USB Drive, SD card, other) attached to the GCS 106. The UAV 104 autonomously executes a flight plan while storing data collected by the detector 108, which can then be processed by a geophysicist. This collected data can also be processed directly on the GCS 106.

An important semantic occurs with respect to the flight controller (FC) 116. A casual, consumer user of drone devices and consumer UAV devices may equate the FC 116 with the manual, human-operated hands-on controller that comes with a consumer drone, as suggested by the manual controller 105 shown in FIG. 1A. However, this would be mistaken.

It's important to be aware that the FC 116 referred to herein is not equivalent to any manual "controller". Instead, the FC 116 herein is a combination of electronic and mechanical components that plays a part in the entirely non-human and thus autonomous operation of the UAV 104. Further, other than during assembly described herein, no human ever touches the FC 116. Most of the special autonomous and metal detecting functionality actually comes from the GCS 106 and is not part of the FC 116.

This facilitates adding functionality to the UAV 104 while using fairly simple electronics and logic within the FC 116. Thus the system 100 can easily be adapted to different drones.

Further, an embodiment of the UAV 104 exists in which some non-metallic or minimal-metal components may also be detected or flagged by the UAV 104, potentially using shape information obtained by camera. In that embodiment, the system 100 surveys a location to detect metal targets, with particular emphasis on UXO/IED/EROW (UXO==unexploded ordnance, IED==improvised explosive device, EROW==explosive remnants of war), but also with at least some ability to suggest certain of the metal targets may be benign, e.g. old Pepsi cans (see FIG. 1C).

The effective depth of the metal detector 108 is up to 3 m, varying mostly via size of a target object size. A particular ground structure is almost irrelevant, and the metal detector 108 is agnostic (indifferent) to water and mud.

The system 100 utilizes an autonomous UAV incorporating a custom time-domain metal detector, and is fully compatible with standard tools for UXO and mine detection. For the system 100 to work effectively, maintaining a stable distance of UAV 104 from ground is crucial. This feature leads to increased accuracy of the detector 108. The system 100 is capable of precisely following real world terrain at distances as close as 20 cm, and is able to avoid obstacles in its flight path.

The system 100 cuts down UXO-survey times to a fraction of time needed for conventional survey methods currently being used for UXO and mine detection. Further, the system 100 achieves this while improving accuracy, safety and cost effectiveness.

Figure 2:
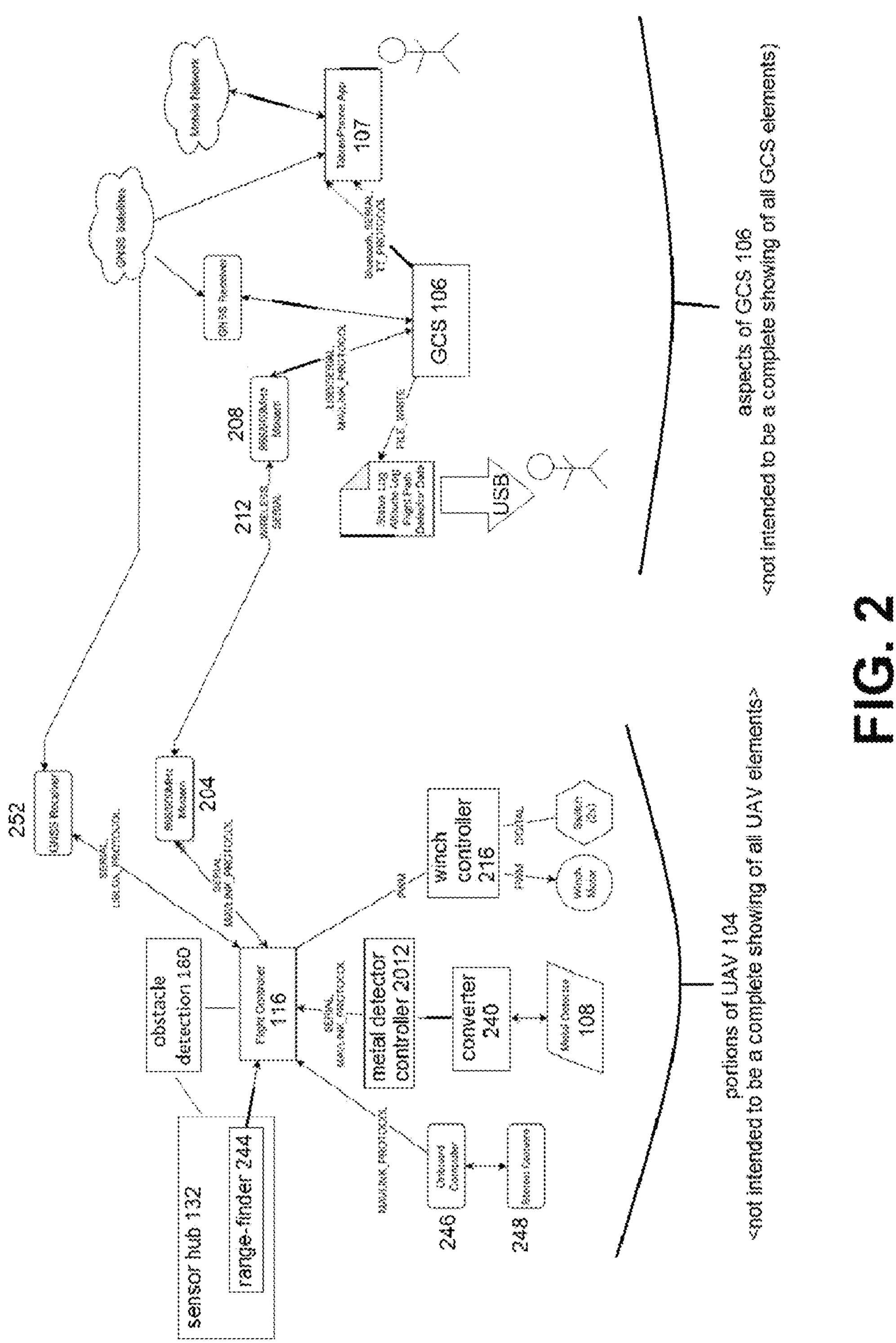
FIG. 2 shows a network topology-map of the system.

The FC 116 mainly carries out commands from the GCS 106. Thus, the GCS 106 is the real brains. As shown in FIG. 2, the GCS 106 is not just one item, but a complex sub-network of various devices, and was designed and pre-configured to be fairly adaptable and universal, working with various UAVs or flight controllers. Thus, the specific UAV-designs and FC-designs herein are but for example-only, and should not be considered limiting.

The GCS 106 has many different tasks ranging from controlling flight of the UAV 104, communicating with the tablet app 109 (thru tablet 107 or mobile device), and analyzing and mapping UXO data. The GCS 106 system uses a different approach to controlling a UAV than most other systems.

Specifically, within the embodiments herein, the GCS 106 is constantly controlling the flight in real-time, while the UAV 104 just does simple tasks like stabilizing the UAV 104 or at most flying to a GPS location. Most of the time the GCS 106 is giving simple thrust and tilt angle commands to the UAV 104. The GCS 106 does all the work to get the UAV 104 to where it needs to be, control the payload within the UAV 104 like the metal detector 108, and receives all sensor data from the UAV 104 in real-time and factors this as a basis for navigation decisions.

This removes any need for powerful CPUs in the UAV 104, so even a very small UAV 104 can example have great capabilities including processing any UXO and terrain mapping data in real-time for autonomous flight and obstacle avoidance. It also means that the full functionality can easily be used with new UAVs. The GCS 106 logic which can just connect to different UAVs to control them.

FIG. 2 shows a network topology-map of the system 100. FIG. 2 tries to show not only various elements within the system 100, but also the type of communication link between them, in most cases a wireless link. Of particular important is the link 212 between the GCS 106 and the UAV 104. All communications between the GCS 106 and the UAV 104 occur using a single communication channel. This is valuable at least for flying many drones in one area without interference, simplicity and robustness of data transfer, increases range of transmission, and a possibility to use various data transfer methods from wireless modems to cellular network.

The controller board 240 works with the metal detector controller 2012 and configures the metal detector 108, and contains a converter for converting voltage levels. An embodiment may use the RS232 protocol, but other protocols could also be used.

The laser rangefinder 244 from FIG. 2 is located inside the sensor hub 132. This is important for proper navigation and image-capture by the UAV 104, as will be explained in more detail elsewhere.

The wireless modems 204\208 of FIG. 2 are configured with predetermined settings that can be adjusted depending on various operating conditions and hardware availability. The WiFi UDP of FIG. 2 is an option. Various versions of the Android operating system sometimes make WiFi UDP unsuitable, so Bluetooth is also an option.

FIG. 2 shows a metal detector (AKA coil) control box 2012 for the metal detector 108 which stores pre-configured logic. The metal detector 108 may contain coils, but may also be implemented other ways. In an embodiment, the compiler for the pre-configured logic can be BASCOM, and in an embodiment, the customized hardware platform within 2012 can be a ATMEGA328 on a custom PCB with some peripherals needed for the MCU and level shifting. However, if there was an embargo on ATMEGA328 hardware, the embodiments herein could substitute an Arduino or raspberry pi.

The metal detector control box 2012 has 2 main tasks:

1) control the metal detector 108 to set the correct operating conditions, and
2) read and process the output from the metal detector 108, and convert it into a MAVLINK-compatible message that is then sent to the FC 116 which relays it to the GCS 106.

Serial messages to configure the metal detector 108 are sent in a specific order and timing. Then, the metal detector 108 begins emitting serial data messages that are buffered, split and analyzed. If data flow from the detector 108 stops, the various computer-implementations and pre-configurations automatically detect and re-initialize the detector 108.

The metal detector control box 2012 comprises a customized hardware platform loaded with pre-configured instructions & logic, and performs calculations used to create an average of the detector's TX current, and also create precise timestamps that are added to the averaging-data. Those timestamps are used throughout the system 100 to synchronize data from various sources (e.g. metal detector 108, GPS/GNSS position, altitude, other).

Unfortunately, the MAVLINK protocol doesn't have a preserved message field for metal detector data. The embodiments herein thus repurpose different message-packets and use their payload bytes according to tables and inputs unique to the system 100.

The metal detector 108 provides 4 data channels, comprising scaling factor, timestamp, TX current, and detector supply voltage. This data is sent 16 times per second from the detector 108 and is sent over a serial TTL line to the FC 116 who relays it to the GCS 106 where the bytes from the message are taken apart again for further processing.

To configure the metal detector 108, serial messages are sent in a specific order and timing by the metal detector controller 2012. Then the detector starts to output serial data messages that are buffered, split and analyzed. If the data flow stops for any reason the logic automatically re-initializes the metal detector 108 after a timeout.

The metal detector 108 sends data over 4 channels: scaling factors, timestamp, TX current, and detector supply voltage. This happens 16 times per second. The data is then sent over a serial TTL line to the UAV 104 flight controller which then relays it to the GCS 106 over a wireless MAVLINK connection where the bytes from the message are taken apart again for further processing.

Moving on to detector data logging by the GCS 106, the data sent by the metal detector controller 2012 is received by the GCS 106 after being forwarded by the flight controller 116. The GCS 106 then buffers that data, analyzes it, adds more information and logs it into a file (see FIG. 2). The logging is automatically started when the UAV 104 reaches the area to scan, and it is stopped when the mission is finished. If the UAV 104 has to come back for a battery change during a mission, the non-useful data parts are automatically removed.

The GCS 106 detects which payload is mounted to the UAV 104 by a custom use of another pre-configured MAVLINK message. The MAVLINK standard doesn't include a universal payload identification message, so then re-purpose a different MAVLINK message. This is overcomeable by identifying every custom payload currently connected to the UAV 104. This is another example of leveraging the various byte-formats of the MAVLINK message-protocol or message-format differently than intended.

The detector controller board identifies itself as metal detector through the system described above, and the FC forwards this message to the GCS 106. The GCS 106 then controls the UAV 104 accordingly, with the knowledge that it has the metal detector 108 attached.

Once the detector has identified itself it starts sending data through the custom message described. This data is received by the GCS 106 where it is buffered and analyzed. The custom messages are decoded and the individual channels of the detector are calculated from the received bytes. The channels are then corrected with the TX pulse current values for each detector pulse.

The metal detector data then has to be fused with position data from the UAV 104 at the time the reading was taken. Both GPS receiver and metal detector 108 have different delays from the point a measurement is taken until it is received at the GCS 106, and the logic within the metal detector controller 2012 software accounts for those delays and aligns the data. One reference is the timestamps created by the metal detector controller 2012.

The UXO and terrain data is then fused together and saved in an industry compatible data format that combines position data with metal detector data As shown at least within FIGS. 3-8, a customized mobile app 109 is pre-installed on the tablet 107. Within that mobile app 109, FIGS. 3-8 show various GUIs that will be accessible on the tablet 107 which as shown in FIGS. 1-2 is in close communication with the GCS 106.

Within the app 109 there exist three tabs that can be selected at the top of the screen: Mission 308, Control 312, and Checklist 316. The app 109 can be used on a tablet, computer, or Android mobile device. In an embodiment, a language for coding the logic within the app 109 can be B4A, and a potential platform could be an android device.

Although difficult to see within FIG. 3, below the three tabs 308, 312, 316 is a red or green line where red=no connection to GCS 106, while green=successfully connected. The example shown in FIG. 3 and other figures is Android, but that is for convenient reference.

The mission tab 308 displays a map view with position of the UAV 104, position of the mobile device, and position of the landing area, as well as display of the planned mission. Initially, the map zooms in on an overview area near the UAV 104. If the UAV position cannot be determined, then it assumes a position near the operator. This view also shows mission and scanning results processed by the GCS 106 in real-time. For a UXO or mine detection survey the app 109 shows the scanning coverage as well as found targets and their size directly on a world map e.g. Google earth.

One can zoom in on the area with + or −, or by pinching the screen. Automatic tracking of the UAV's position is activated/deactivated by clicking the target cross-hairs at the top right. If deactivated, the map can be positioned with the finger, zoom gestures are also possible. The zoom can also be freely selected in the automatic tracking view and is retained. Menu options also exist for creating new missions, different mission types (e.g. Metal Detector Survey).

The control tab 312 displays all important system messages during operation, as well as some controls for automated flights. Examples include the following:

Display of status messages of the system.

Display of the remaining battery charge (%) of the UAV.

Display of the mission progress.

Display and setting option of the flight speed of the mission. Can be adjusted in flight if needed.

Control options of the UAV: Takeoff, Return+Land, Fly Planned Mission, Abort+Enable RC Control, Pause (e.g. FIG. 3).

All items within the checklist tab 316 must be completed before flight, otherwise the software does not allow the operator to take off or start a mission. This checklist 316 guides the operator through setup of the GCS 106, the UAV 104, and ensuring proper location of all equipment and personnel during flight. Use this screen to ensure all tasks needed for safe flight are completed.

Planning of missions is done through the control app 109. The missions can be planned ahead of time or done at the location of the survey. Planning a mission with UAV 104 Control app is done with the following procedure:

On the app 109, users can navigate to the Mission tab 308 and select New Mission in the top left corner of the map. That will bring a user to the GUI shown in FIG. 4A. Enter desired mission parameters (e.g. sensor altitude over ground, lane spacing FIG. 4B) or leave them blank to repeat the last used values. Appropriate default values are auto-loaded if this is the first mission.

Lane Spacing: width of the survey lanes. No overlap is added and lane spacing is specified directly. Flying Height: distance that the detector will be above the ground, in centimeters.

There are different ways to select the area that has to be scanned. A user can place mission coordinates on the map by tapping along the perimeter of the desired area to be surveyed. Or a user can load a mission by pressing the Load Area button to fly a previously saved mission.

It is possible to zoom into the map (e.g. FIG. 4A) and then create the perimeter by tapping. Users can also zoom in between placing points for even greater coordinate placing accuracy. The last point can be removed with a long press (2 seconds) on the map.

There is also a "Enter Marker Coordinates" button at the top of the screen where manual coordinates can be entered. When pressed, the coordinate of the tablet 107 will show on default. This can help greatly when maps are not available. The tablet 107 can be used to process a GPS location. For example, a user could manually walk with the tablet around the perimeter of a desired mission area and use the GPS location of the tablet to specify the boundary.

A Load and Save Area button exists, and expands to have file select and area name. If doing the same mission more than once, this feature of the app 109 can replicate past missions. When finished mapping the marker coordinates, select Next to progress in this mission. Pressing Save will save this defined area for a later time.

Figure 5A:
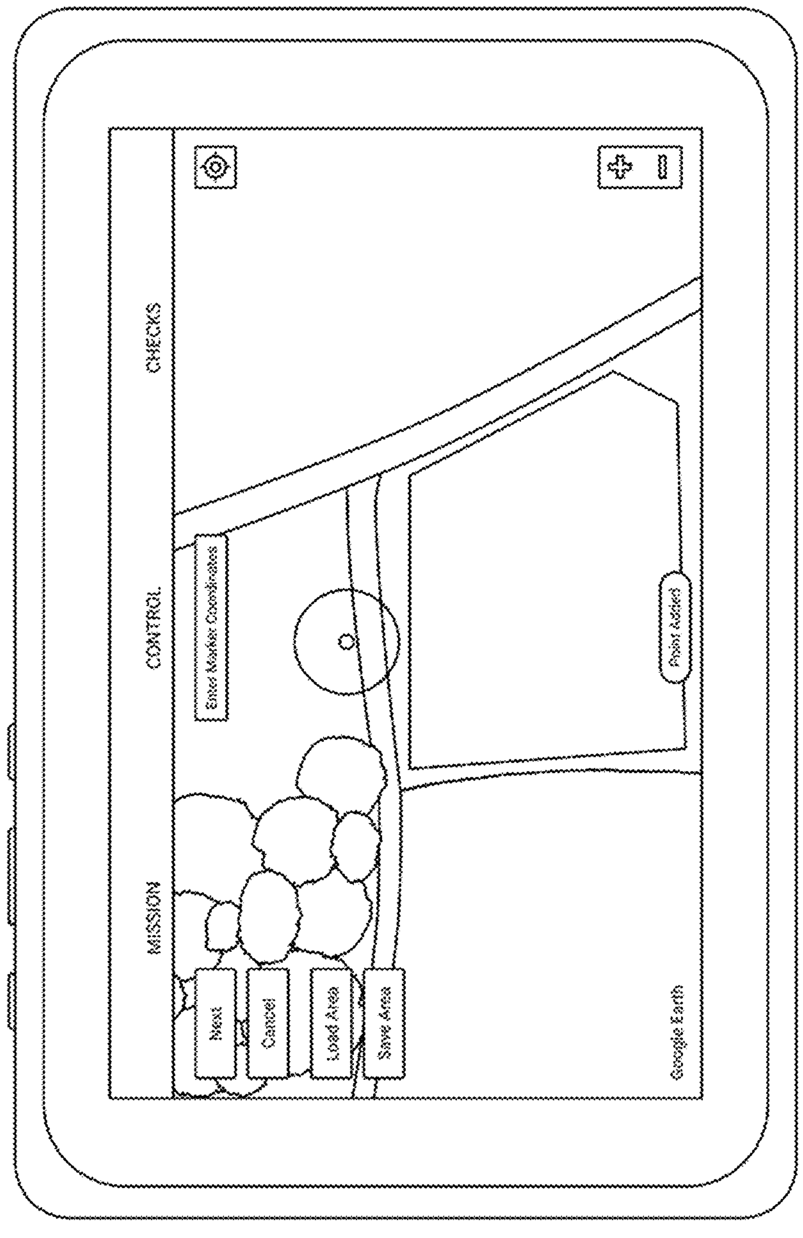
FIG. 5A shows a first screen of the app when a user has selected the mission tab.
Figure 5B:
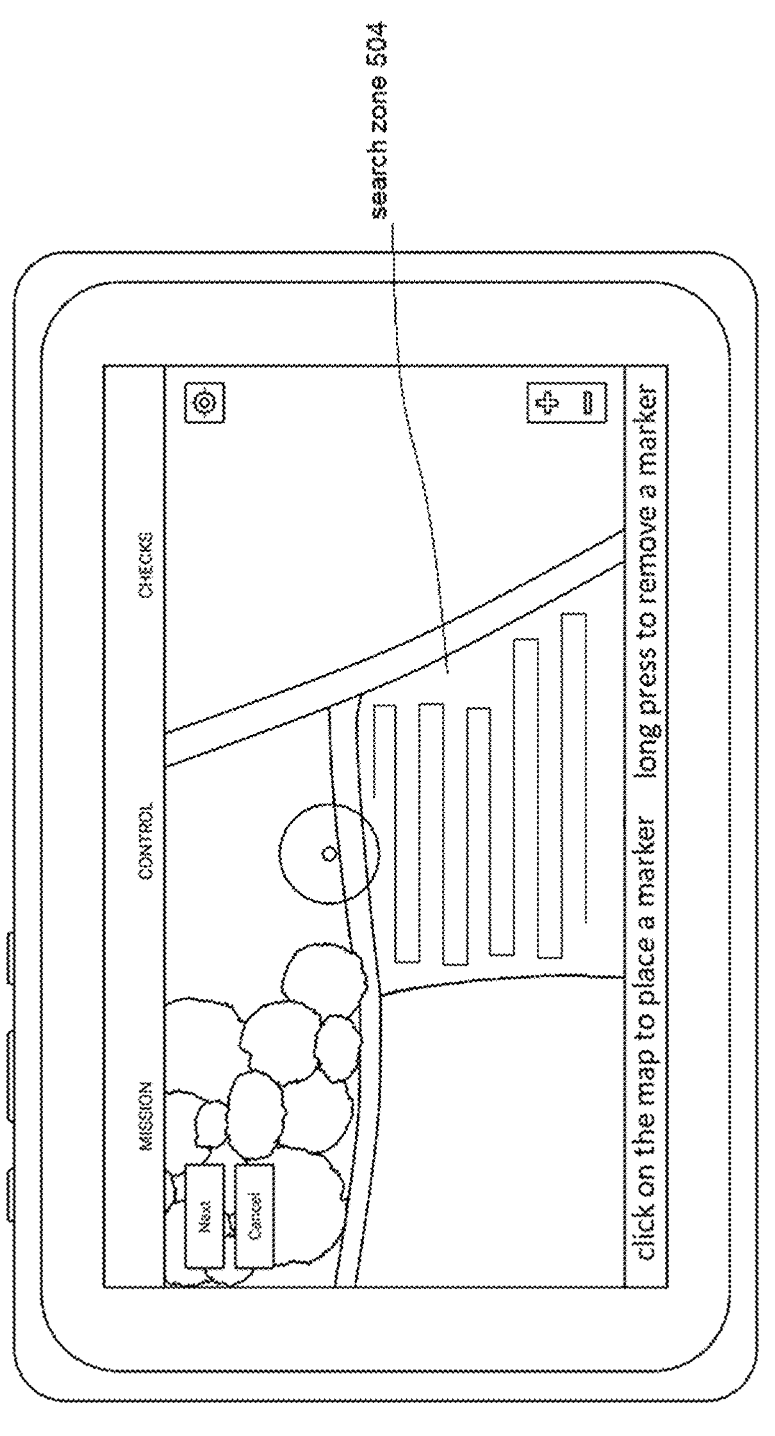
FIG. 5B shows an example search zone.
Figure 6:
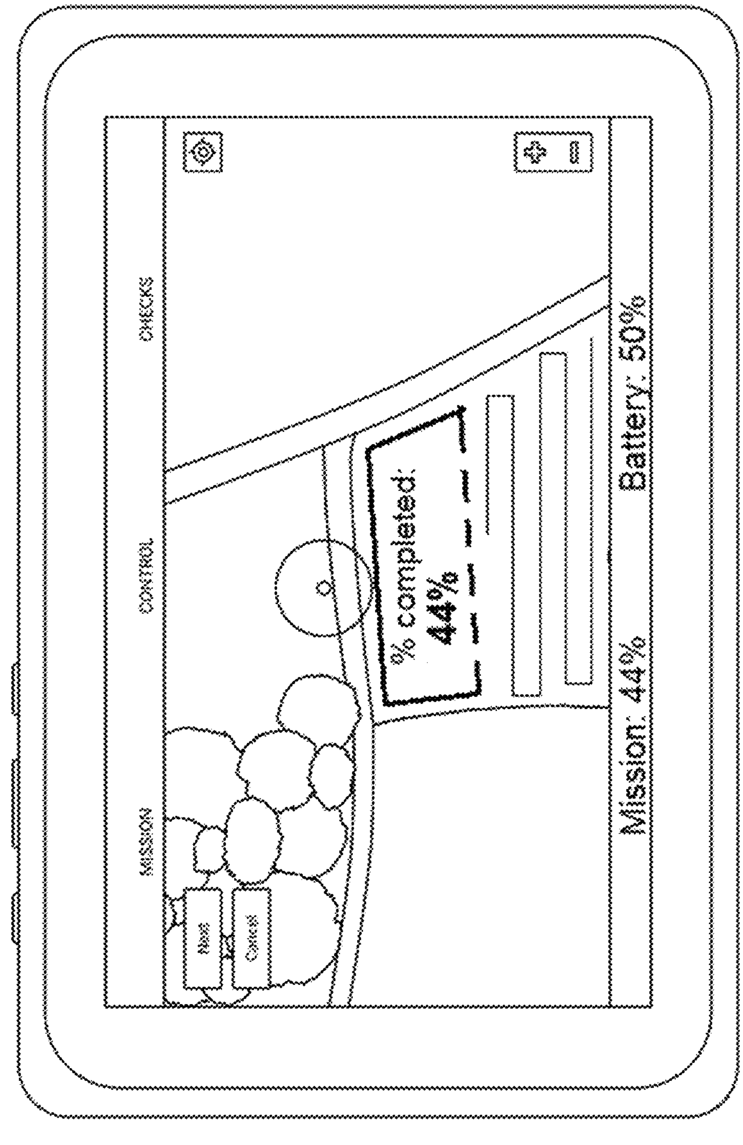
FIG. 6 shows how the GUI changes to show detection-progress.
Figure 8:
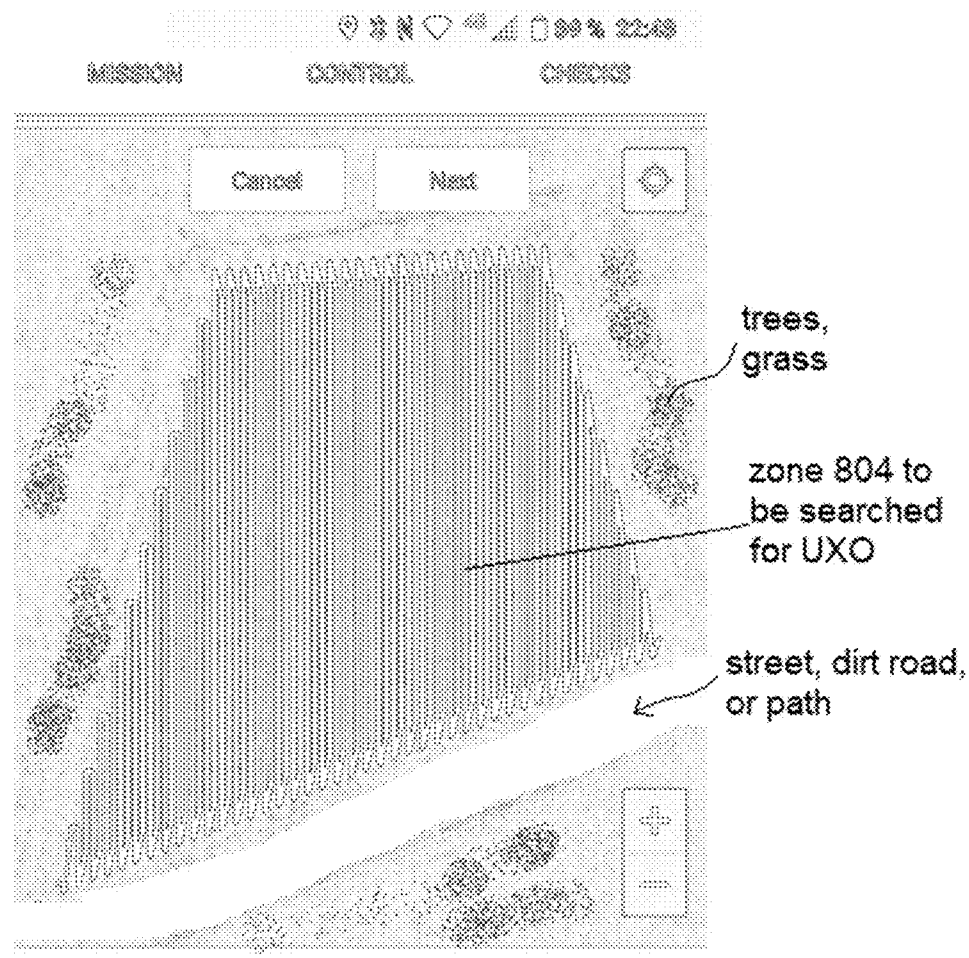
FIG. 8 shows an example GUI of a zone to be scanned for UXO.

After selecting Next, the mission is processed and a flight path is generated on screen as shown at least in FIGS. 5B, 6, and 8. Review the flight path and press Next again to finalize and load the mission onto the system 100. Select the appropriate speed on the slider 340. The default is 2 m/s and is used for most missions. Rough terrain or obstacles require a slower speed. A slower speed can also be used for a very detailed scan of the area to achieve more data points.

Before starting a mission, the checklist under the checks tab 316 needs to be completed. To begin flying the planned mission, a user will select Fly Planned Mission button 366 within the control tab 312 to start flying the mission. On the mobile device one must press and hold the button 366 for three seconds. This prevents accidentally launching the UAV 104.

The "Mission Planning" button is where user taps on the screen to place a marker. Once that is done, there exists a slider 340 for changing speed. Even during the mission, a user can change the speed of the UAV 104. For example, in a rough rain, the slider 340 can make the UAV 104 run slower.

Figure 4A:
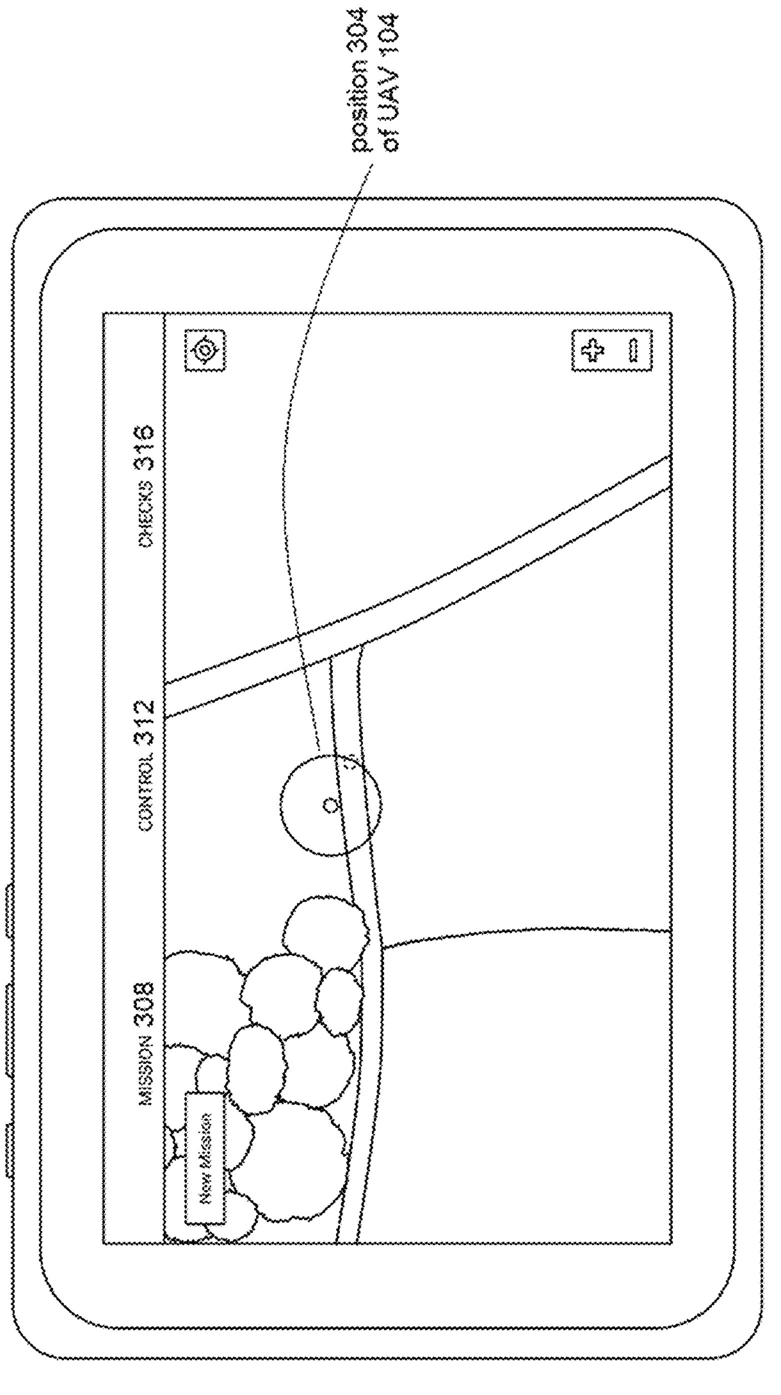
FIG. 4A shows a GUI for enabling how to begin a new mission or select an existing mission.

FIG. 4A shows an example zone for which UXO detection will be performed. The UAV 104 starts out at a beginning position 304. As shown in FIG. 4A, an initial GUI presents a user with three different options, mission 308, control 312, and checks 316. Assume a user goes to the mission 308 tab. As shown in FIG. 4A, that user can see the position of the UAV 104, and begin a new mission or select an existing one, including selecting target zones needing UXO detection. The app 109 will require a user to configure a specific size, contour, and area.

Figure 4B:
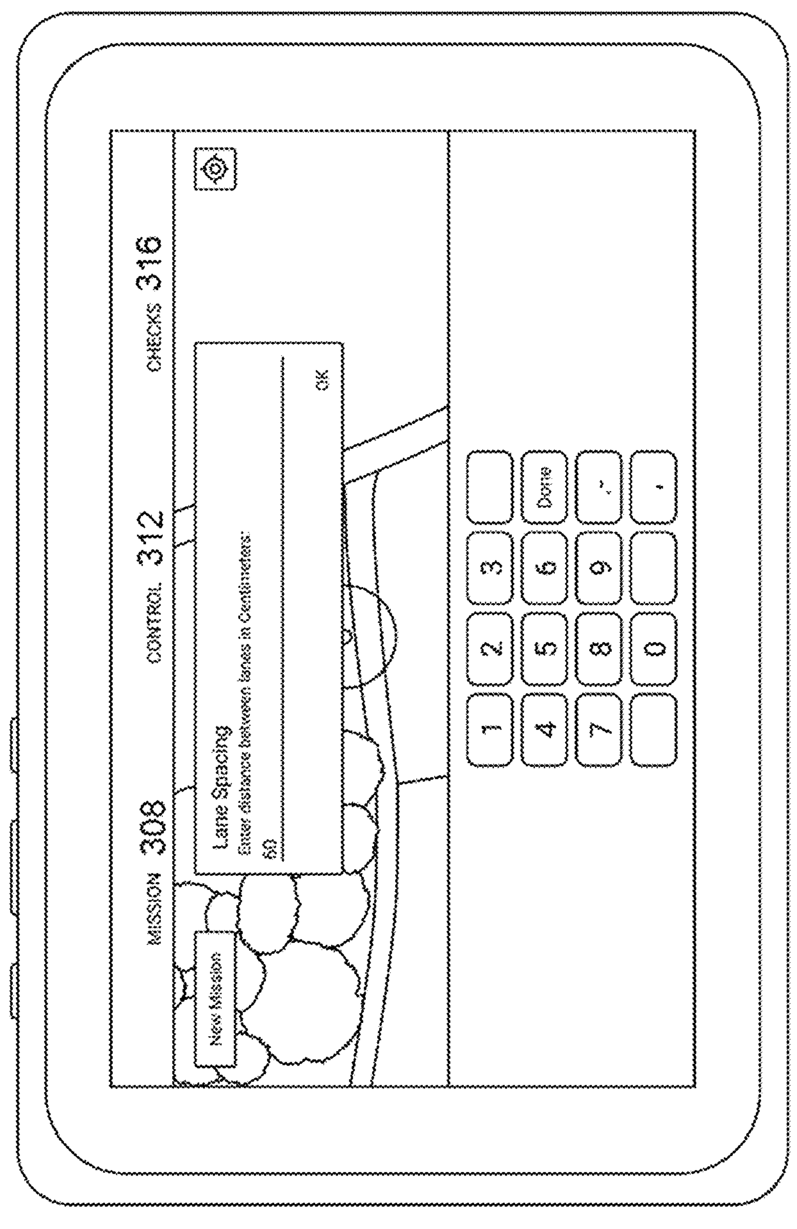
FIG. 4B shows the app prompting of a user to enter a choice for lane spacing.

FIG. 4A shows during setting of a mission a user-prompt to "Click on the map to place a marker" and also "long press to remove your last marker". FIG. 4B shows the app 109 prompting of a user to enter a choice for lane spacing.

FIG. 5A shows a first screen of the app 109 when a user has selected the mission tab 308. A beginning position of the user plus tablet 107 is shown, but no search zone has yet been chosen. FIG. 5B shows an example search zone 504.

The system 100 accommodates many geometric patterns to employ during a UXO mission. Among these are parallel lanes, spiral, elliptical, and even a lane-style resembling the video game "breakout". FIG. 5B shows an example search zone 504 in a parallel rectangle mode.

After building a zone (e.g. zone 504 FIG. 5A or zone 804 FIG. 8), a next step taken by the mobile app 109 would be to display a GUI allowing a user to enter a distance between lanes traversed by the UAV 104, as was first shown in FIG. 4B. A default setting might be 75 cm, which means the metal detector 108 has a one meter sensing width, but keeps a lane-overlap of 25 cm, which means a net-effective yield of a path-sweep might be 75 cm.

IOW, this setting means that 25 centimeters of each lane overlap with an adjacent lane just to make sure the system 100 doesn't overlook anything. Normally the GUI defaults to a specific number, but if users changed this setting in an earlier mission, the system 100 will retain the most recent selection e.g. 60 not 75.

Moving to the elevation lift-off of the UAV 104 and the metal detector 108 therein, a GUI (not shown) of the app 109 will request the user select a height-from-ground of the detector 108. One default might be 42 cm, while a lowest boundary might be 20 cm. These depend on the hilliness and contour of the terrain within the user-selected zone. The number 40 cm is included because this is a default selection when using a hand (cart) detector.

Next, a user will click on the GUI shown in FIG. 5A to create a shape of the zone to be analyzed for UXO, prompting a user with a "enter marker coordinates" menu. Users can enter any shape, and can also enter safe (excluded) areas that will not be explored, e.g. a "carve-out". FIG. 5A shows a marker coordinates GUI, used in designing the boundaries of a particular zone. FIGS. 5A and 8A show example flight paths 504, 804 respectively. FIG. 6 shows how the GUI changes to show detection-progress, i.e. how much of a zone has already been traversed v. how much remains to be traversed.

Users can also manually enter coordinates for zones to be searched for UXO. If the user does not enter anything, the position shown is the actual position of the tablet 107 or mobile device. In such a case, a user can actually walk around the permit perimeter function, whatever position the user outlined will be auto-recorded. If users have predetermined shapes like areas, squares, grids that they want, that user can just enter their preferred shape.

Users can also hit a "next" GUI during their mission-prep, so that they can see, scope, and check that mission for accuracy in a macro-view. As shown in numerous figures, portions of the GUI also show battery level, speed of the UAV 104, and other important attributes. Regarding shapes of the zones, possible shapes could include spirals, latticing, oblong, and disconnected (e.g. bypass specific areas e.g. trees or farmhouses).

From the various GUIs on the tablet 104, the slider 340 (FIG. 3) enables users to select how fast the UAV 104 is traveling, request take off, come back, pause, and other features. So if user wants to cancel a mission completely, there is an "abort" button. If the UAV 104 is on the ground, many of these navigation options will either be grayed out, or non-enabled.

Figure 3:
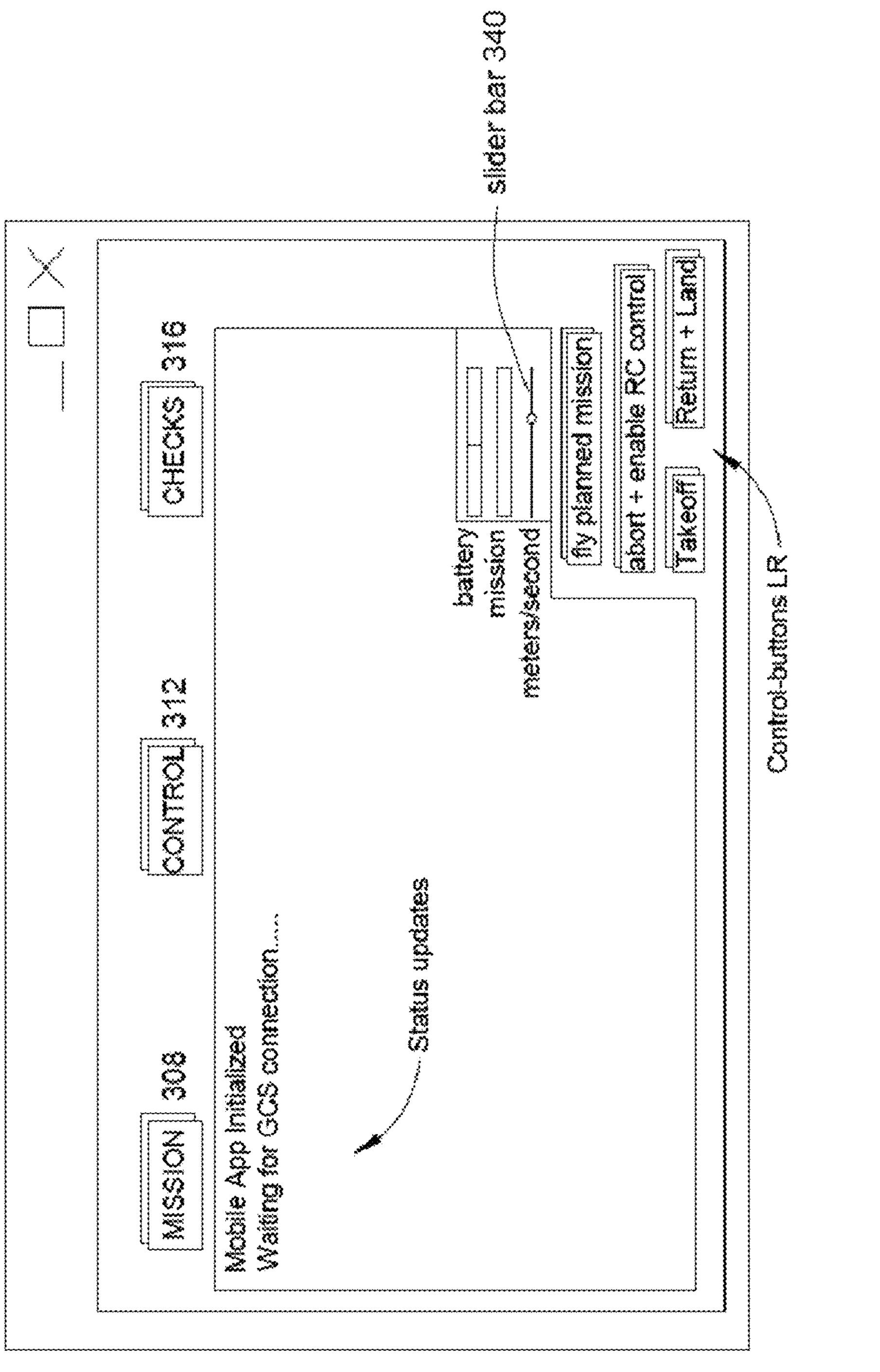
FIG. 3 shows an example GUI for configuring and operating the system.

As shown in FIG. 3, users can also start a next mission by using the button "Fly Planned Mission".

Figure 7A:
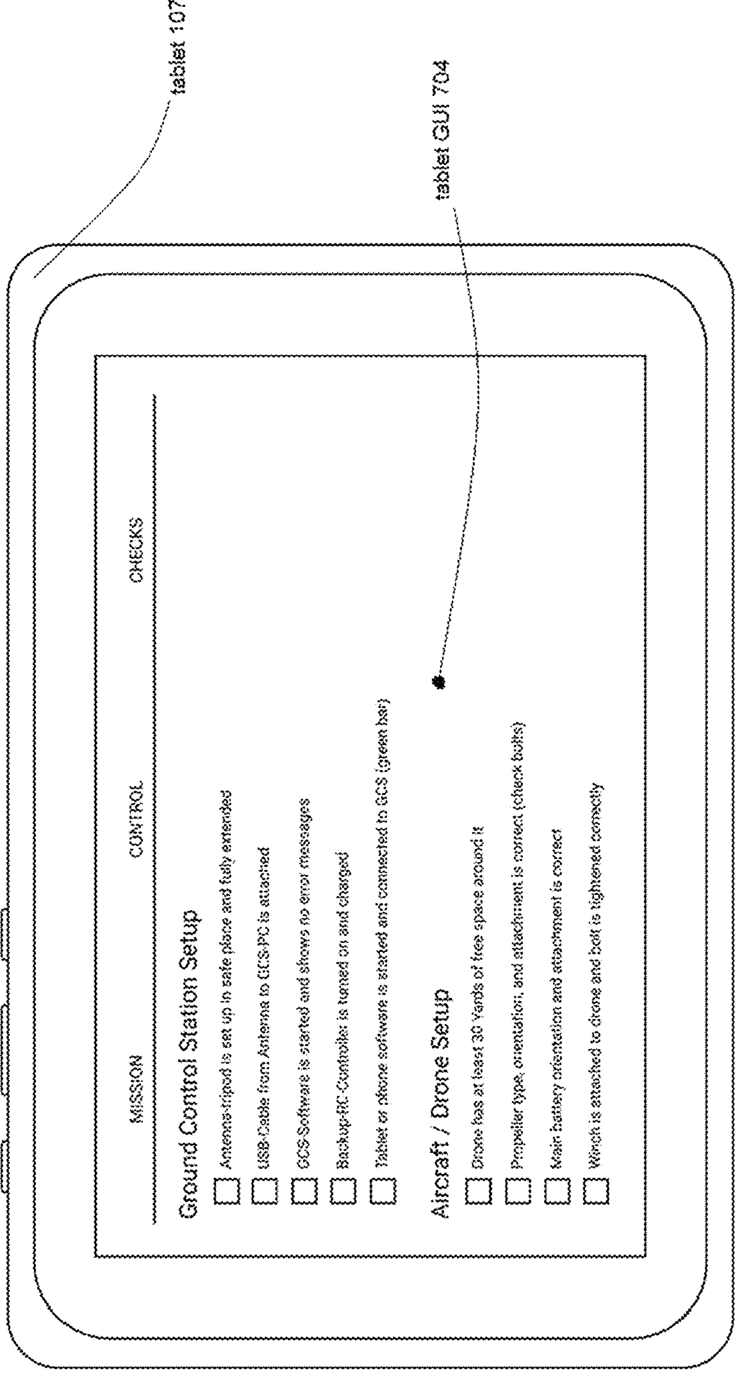
FIGS. 7A-7B show menued check-boxes.
Figure 7B:
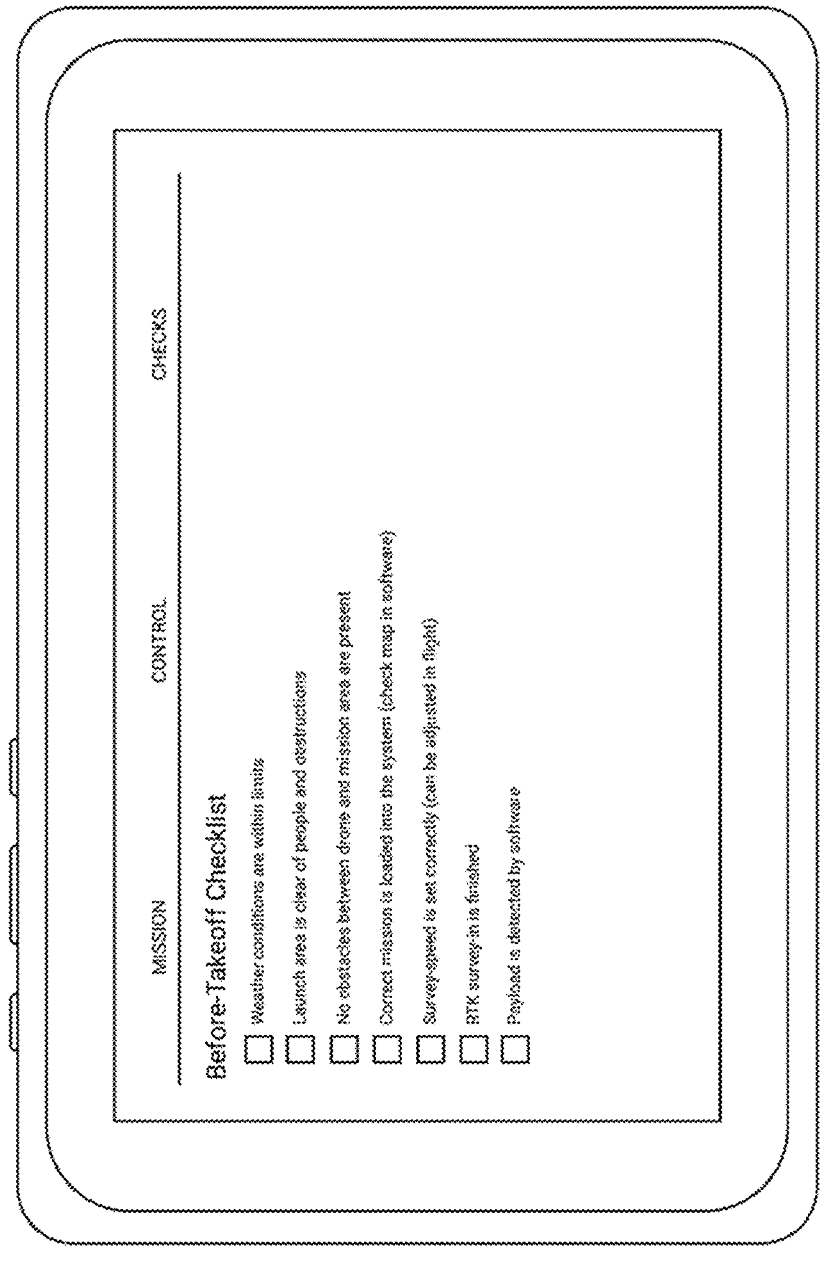

FIGS. 7A-7B show check boxes which are helpful/necessary in creating a zone, and also in preventing problems in the usage of the UAV 104. Specifically, FIGS. 7A-7B show menued check-boxes, where users must go through all those boxed items and check them one way or another. Otherwise, the UAV 104 will not allow itself to take off and become airborne. There are a lot of safety steps and complexities to operating the UAV 104, so a lot of precautions are necessary.

FIG. 8 shows an example GUI of a zone 804 to be scanned for UXO.

Regarding tablet 107 to GCS 106 communication (FIG. 2), in an embodiment, the logic can be written combining B4A+Visual Basic 6. The specific hardware 107 might be a tablet, an android device or a Windows PC.

The tablet 107 communicates with the GCS 106 via either a Bluetooth or WiFi connection. The communication protocol is developed from scratch and unique to the system 100. This proprietary protocol supports various different functionality, like status messages from the GCS 106 to the tablet app 109, mission planning, position updates, control commands from the user to commend the GCS 106 to carry out missions or change the speed or other functionality, map overlays to show mission results, and much more.

The connection (FIG. 2) between the tablet 107 and GCS 106 is completely automatic and requires no configuration. Also, one tablet 107 can control multiple GCS 106/UAV 104 systems 1001-*n*. The Android software automatically scans the area for all devices in range, while every GCS 106 advertises itself via Bluetooth or WiFi with a unique identifier that declares it as a GCS 106 and includes a unique serial number for every GCS 106. If only one GCS 106 is in range, the tablet 107 will directly connect to it and allow control of the system 100. If multiple GCSs 1061-*n* are present it prompts the user to select the correct one with a list showing the unique IDs. The ID of every GCS 106 can be found on its GCS 106 PC screen. If the operator wants to control a different UAV 104 system a user can instantly switch between all systems in range with an icon on the control tab 312.

Once the tablet 107 is connected to a GCS 106 it shows all status messages of the system, the UAV 104 position, its landing position, battery level, selected survey speed, mission progress, mission results, and much more. This information is constantly sent out by the GCS 106 in data packets, depending on the information either in real-time or at different intervals. The information is then processed by the Android software and displayed in appropriate ways to the operator. Further, all of this is sent through a single communication channel.

On the other hand, if the operator changes a setting or presses a button on the tablet screen the app 109 sends out a command to the GCS 106 informing it about the input. The GCS 106 then takes appropriate action to fulfill the request.

A user plans a mission and selects an area to scan and goes through the mission planning process, all information about the mission and flight path is processed and collected by the tablet 107, and afterwards sent to the GCS 106 in special mission packets that can contain information about the flight path, requested altitude, speed, and so on. This is then collected and processed by the GCS 106 which in turn controls the UAV 104 appropriately during the mission. The mission information also is saved on the UAV 104 and requested by the GCS 106 from the UAV 104 when a mission is to be flown. A mission can be permanently saved inside the UAV 104's memory and any GCS 106 can read it and fly the selected mission in this way. The GCS 106 doesn't have to keep track of which mission was intended for which UAV 104.

The same replication is done for other settings, like the requested survey speed, or also values the user can't change like internal information about the battery type used on each specific UAV 104. All this is saved inside the UAV 104's memory and can be requested by the GCS 106 to control the UAV 104 appropriately without needing a database to keep track of each UAV 104's settings. The tablet 107 can also set or request values from this communication interface and use them as needed, for example to display the battery level or mission speed selected.

The UXO data collected is continuously analyzed. As the raw UXO data doesn't really tell the user anything, a set of display logic shown at least within FIGS. Sep. 10, 2011-12 tries to find possible targets within the data and creates several different file formats. Those file formats contain data in several different ways, including visual maps and images, tabular data, digital maps, location data of UXO targets and so on.

The arrangements of FIGS. 9-12 show which locations have the most metal, but of course that metal can be benign, non-ordnance. Still, the system 100 can extrapolate from raw metal data to specific ordnance components e.g. anti-tank explosive, plastic anti-tank explosive, etc. One way to achieve this is by estimating what UXO might be present, partly based on a metal decay curve.

To collect this UXO data, noise-levels are measured. As the ground structure, environmental factors, the UAV 104, and other factors create noise in the UXO data-signal being sent from the UAV 104 to the GCS 106. Then, find the correct threshold to cut off the noise. This is different in every mission and on every metal detector 108, so a universal approach has been implemented. Every data point from a mission is used, and the longer the mission, the more data the system 100 can work with, including noise-data and trends in noise, creating more precise results.

Figure 9:
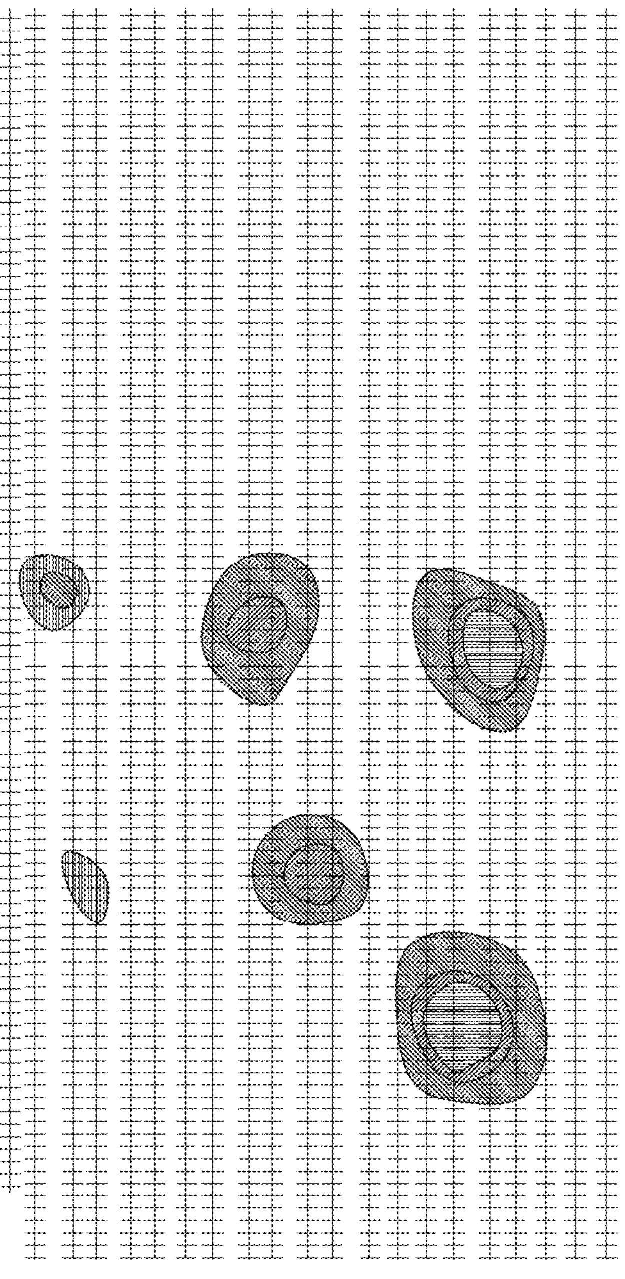
FIG. 9 shows one potential type of output file.

One potential output file is shown in FIG. 9, meaning calculate an exact location of every single data point that is above the predetermined noise level, and then save it in an industry standard format. After detecting the noise level, the GCS 106 looks for the data points that are above the noise, and then searches for the peak value in each geographical location where a signal exists. The location of the peak is then categorized, depending on the signal strength.

This UXO data can be saved as a spreadsheet (e.g. CSV file). Every target is saved with coordinates, size and other information. this data can be used for various applications, the most obvious being that a UXO/mine removal team can go to each location and examine+remove the possible threat with a high degree of certainty. This file then can be loaded into many different GUIs and mapping applications to create "heat maps" showing the metal content in different locations on a map. Example heat maps are shown in FIG. 9, in which different colors show different metal content. The cross-hatching in the background of FIG. 9 represents a path of the UAV 104.

Figure 10B:
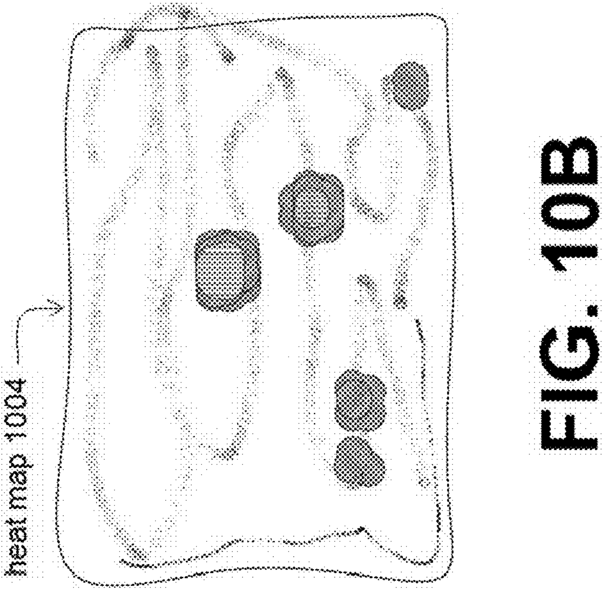
FIG. 10A (Prior Art) shows a specific area of land and FIG. 10B shows a heat map overlayed onto that specific area of land.
Figure 10A:
Figure 10A:
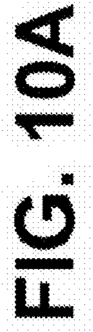

The use of heat maps within the system 100 does not stop there, however. Unlikely FIG. 9 above, FIG. 10B shows a heat map 1004 overlayed onto a specific scanned area (FIG. 10A, Prior Art). The heat map 1004 visualizes the coverage and metal content directly onto a PNG file that is saved with the mission data.

Figure 11:
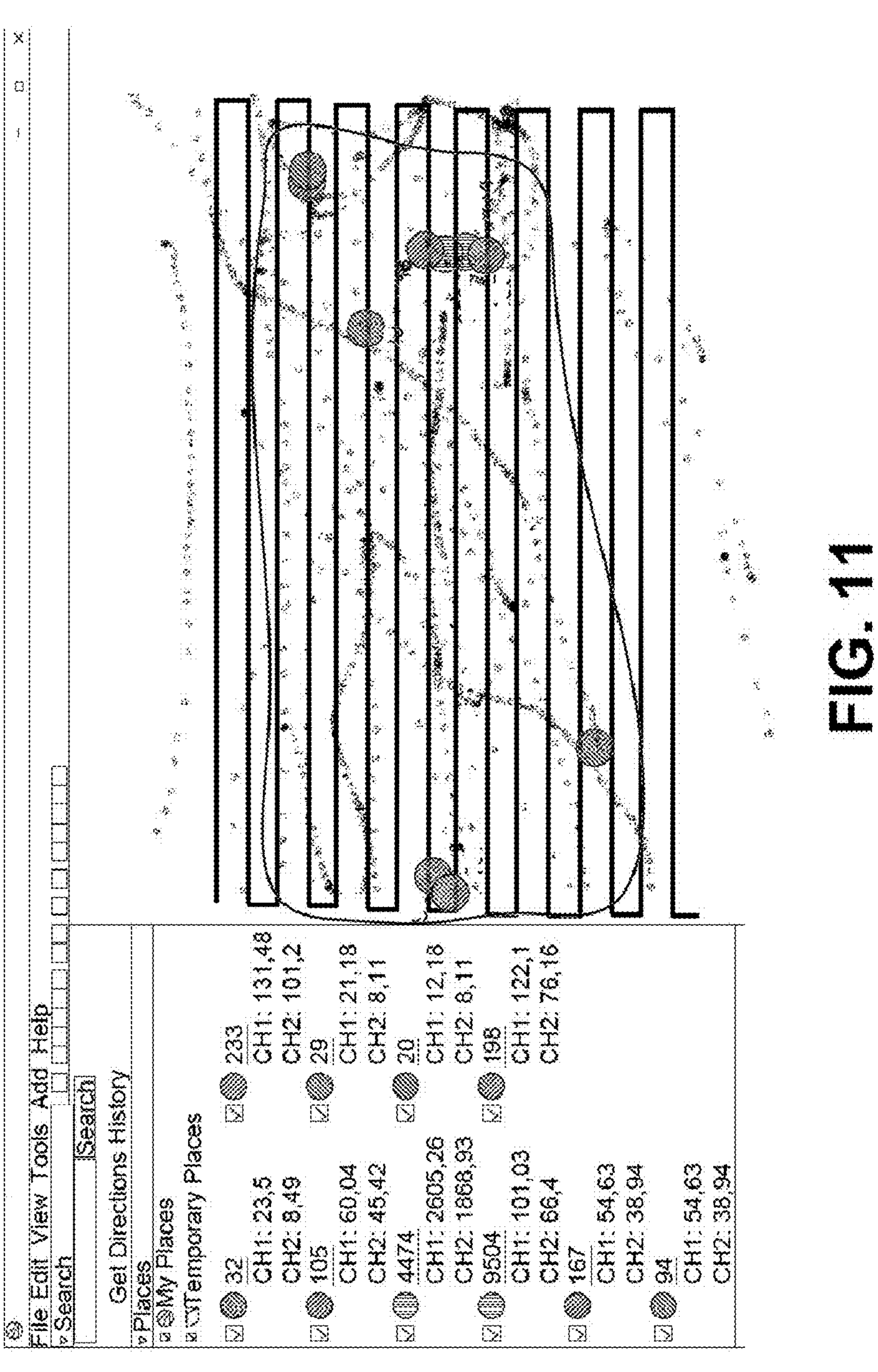
FIG. 11 shows an embodiment of the system using custom icons to visualize different object sizes and a numeric representation of those sizes.

Again, the advantages of the system 100 do not stop merely with the above. The data above is also compiled into a KML/KMZ file that can directly be loaded into Google Earth or other terrain-mapping applications to visualize the scanned area, targets and their size directly on a global map. An embodiment of the system 100 uses custom colored icons to visualize different object sizes on the map, and a numeric representation of the size, as shown in FIG. 11.

Figure 12:
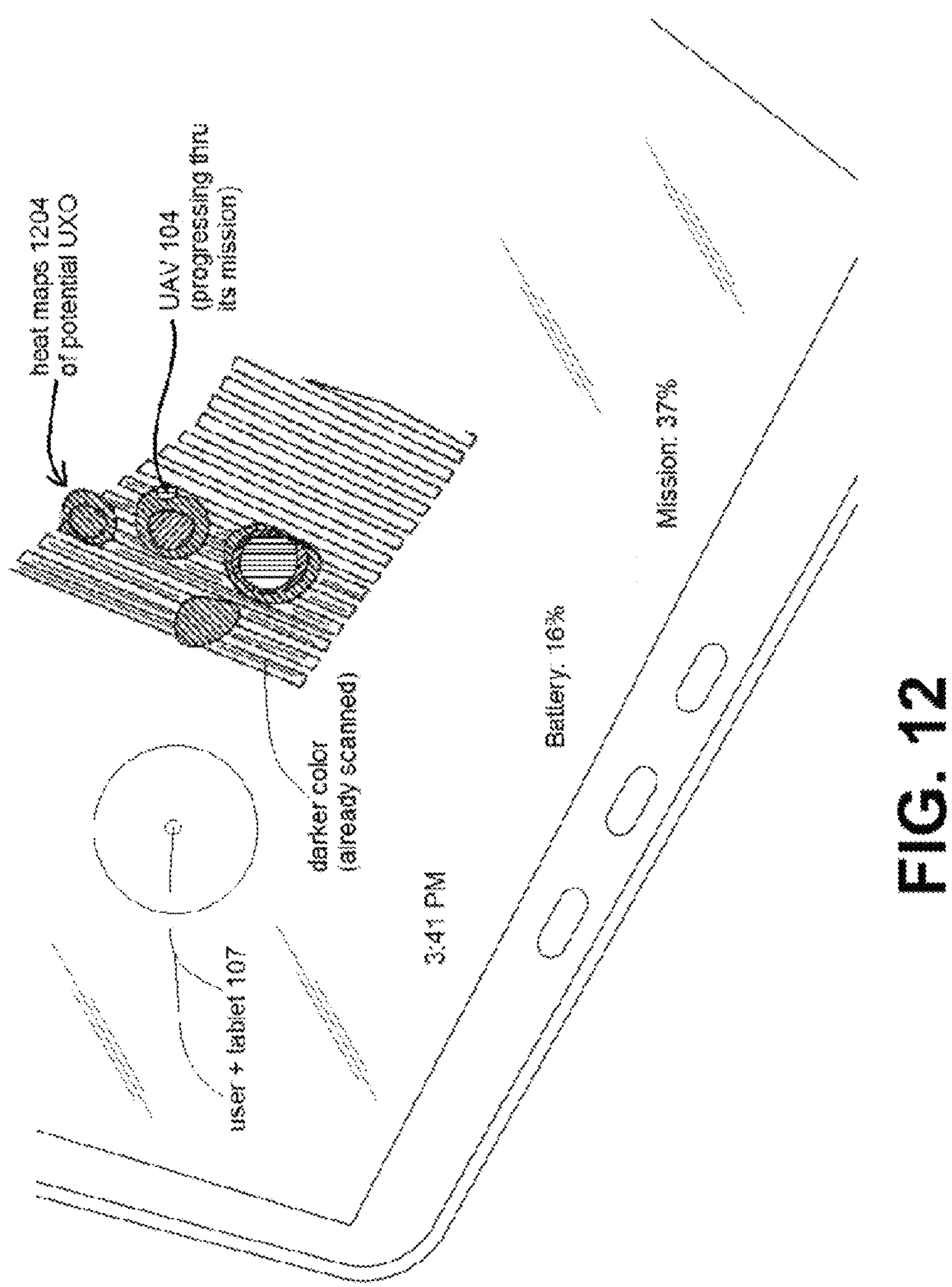
FIG. 12 shows a heat map in which a UAV is traversing a selected area.

The above file formats are automatically created after the UAV 104 has finished a mission. If the operator has connected a USB drive to the GCS 106 PC the data is directly transferred to it. Real-time processing of the data can be obtained while the UAV 104 is still in the air flying a mission. The above calculations are done continuously and a heat map is created in real-time and visualized directly on the map on the tablet 107 that is used to control the whole system 100. The operator can directly see the scanning coverage and all targets the UAV 104 finds directly on this map. An example of such a heat map is shown in FIG. 12, in which a UAV 104 is traversing a selected area. A portion of the selected area that has already been scanned is shown in a darker color, while the unscanned portion is in a lighter color. FIG. 12 also shows how battery % and mission progress % (so far) can be displayed to the user by the app 109.

Communication Details

For all calculations above multiple channels of the metal detector 108 are used. The metal detector 108 is a time-domain detector, meaning it sends out a single electromagnetic pulse and then records the decay of the magnetic field at different time points after the pulse. This decay curve changes depending on the presence of metal. By using the values at different time points, the system 100 can more easily distinguish small items from noise, and the size of an object is easier to determine. After all calculations, every found object is given a dimensionless value that defines its metal content.

As shown in FIG. 2, communication between GCS 106 and Flight Controller 116 on the UAV 104 is done via a wireless serial data link 112. This can be any data link as long as it can transmit serial data. For example serial data modems, but also for example the cellular network can be used.

As stated earlier, the embodiments herein implement the MAVLINK packet protocols for the communication links, but also add to these and customize certain unused MAVLINK pre-formatted data-packets for specialized purposes of use only to the embodiments herein. This allows the GCS 106 to be used with different UAVs or flight controllers fairly easily, as all the special functionality is in the GCS 106 and the UAV 104 doesn't need extensive computing capability.

As described above, the flight control portions of the system 100 are split in two parts. One part is inside the UAV 104, which is the flight controller 116 which has been programmed and configured to stabilize the UAV 104 via PID control, by controlling the speed of each one of the 4 motors precisely and quickly. A big challenge for some UAVs 104 within the system 100 is that a large portion of its weight is hanging on a hinged pole almost 2m below the UAV 104 (due to the metal detector 108). Special tuning and configuration is needed to keep the hinged pole very stable which is crucial for good scanning results. The flight controller 116 has simple capabilities like holding a position, setting specific tilt angles or rotational speeds for each of the UAV 104's axis, and simple altitude control.

The rest of the flight control functionality is contained within the GCS 106. The GCS 106 is in constant communication with the flight controller 116 via the MAVLINK protocol, including some modifications to this protocol unique to the embodiments herein. The flight controller 116 constantly sends information about the UAV 104 and its sensors to the GCS 106 (like sensor data from laser rangefinders, GNSS, tilt angles, magnetic fields, detector data, and so on). The GCS 106 then takes this data and calculates the necessary commands to send to the UAV 104. It constantly is sending correction commands to allow the UAV 104 to fulfill its task.

A takeoff sequence proceeds as follows. First the GCS 106 checks all the data it receives from the UAV 104 for anomalies and performs a "pre-flight check". This contains things like checking the ground facing sensors for out of range values, the GNSS system precision, the battery voltage levels, and more.

If everything looks good, the GCS 106 communicates to the user via the control tablet 107 that the takeoff will happen, and then commands the UAV 104 to start the motors and turn on stabilization mode in horizon leveling mode. Once the motors are running more checks are done, and the takeoff position is saved by the GCS 106 to later return to the same place.

Then the GCS 106 commands the UAV 104 to increase the thrust and monitors the ground facing sensors. Once the GCS 106 can sense an increase in altitude it commands the UAV 104 to keep climbing at this speed and monitors and lateral movement, and corrects it by sending tilt commands to the UAV 104 if needed. Once the UAV 104 has reached a certain altitude the GCS 106 commands it to rotate around its yaw axis while continuing to climb.

It then starts the magnetometer calibration of the FC 106 which is used to measure the orientation of the UAV 104, like a compass. The calibration has to be done during every takeoff as the UAV 104 is very heavy and high current running through the wires on the UAV 104 create changing magnetic fields that interfere with the sensors.

The GCS 106 has a scanning area in memory that it has received before the flight from the control tablet. The GCS 106 monitors the UAV 104's orientation and position and points it to the starting point of the mission. It the commands the UAV 104 to tilt forward while constantly monitoring orientation, position and speed. Tilt angles and rotation are constantly monitored by the GCS 106 and correction signals are sent to the UAV 104 to fly directly towards the starting point at the correct speed. The required speed is calculated from different factors like the distance remaining or the terrain structure. The GCS 106 gradually slows down the UAV 104 once it reaches the end point of the transfer flight.

During the transfer flight the GCS 106 also monitors the ground facing sensors and adjusts the altitude of the UAV 104 to keep clear of terrain. And the GCS 106 also receives information from the UAV 104*s* stereo vision cameras that has been pre-processed by the onboard computer 246. The GCS 106 uses that information to detect obstacles in its flight path and adjusts the flight path as necessary to clear those obstacles.

Once the UAV 104 position is very close to the end point the GCS 106 commands the UAV 104 to hold position and altitude. It the commands the UAV 104 to sink while monitoring the ground facing sensors until the correct altitude for scanning is reached. It then switches over to the next software part which is the survey mode.

This finishes a rough overview of how the flight control system generally operates. More detail exists, but for brevity is intentionally omitted.

For the system 100 to be effective, the UAV 104 must always know its position very precisely. Normal GNSS systems only offer a position accuracy within a meter. But by using a system called Real Time Kinematic (RTK) this accuracy can be brought up in the centimeter range. Generally it works by using a stationary second GPS receiver with known position that can then be used to monitor position offsets and atmospheric interference constantly. This information is then transferred to the moving receiver on the UAV 104 where it is used to remove the inaccuracies from the position data.

The GCS 106 software checks every USB port on boot for data that matches a GNSS receiver (e.g. from FIG. 2) with RTK capabilities. If it finds one it knows, it uses RTK mode and sets up the GNSS receiver to function as a stationary GNSS reference. This is done through the uBlox serial protocol as well as proprietary device-specific additions. The GCS 106 then sets the GNSS receiver into "survey-in" mode, and tells it to find its exact position. This is done internally in the GNSS module by monitoring the GNSS signals for a long time and calculating the most likely exact position it is placed in. The GCS 106 monitors the current survey-in accuracy, and once it has reached a certain threshold stops the scanning and sets the GNSS receiver to RTK base station mode and commands it to output the correction signal multiple times a second.

The GCS 106 then monitors those correction signals coming from the GNSS receiver, buffers and combines them into a MAVLINK message that is then sent to the FC 116. The FC 116 forwards the correction signals to the UAV 104's onboard GNSS receiver 252 over a serial connection (FIG. 2), which then uses the information to precisely locate the UAV 104. The exact location of the onboard GNSS receiver 252 is then forwarded to the FC 116 which in turn forwards it to the GCS 106 multiple times a second.

Obstacle Detection\Avoidance

As shown in FIG. 2, the UAV 104 has a stereo vision camera 248 which among other things calculates the depth of field. The UAV 104 is around two meters high because of the metal detector 108 hanging down closely to the UAV 104 e.g. only 10, 20, 30 centimeters. Have sensors up here two meters high because otherwise it would interfere with the metal detector 108.

This leads to challenges detecting objects that are only e.g. 20-30 centimeters high from the area. So there's lots of challenges in that, for example, not always accurate readings of altitude for the stereo cameras 248 over ground. One cannot just assume a distance above ground, as no certainty on exactly what is tilted in which direction.

The obstacle detection 180 can work with all those problems. So with a very high up camera, small obstacles, tilt angles, distances, the obstacle detection automatically compensates for all this. Obstacle detected and raising height. Lowering height, changing the tilt angles. Another challenge is any given ground area is not likely to be just flat, but instead having complicated shapes and contours. As such, the obstacle detection 180 needs good resolution.

The obstacle detection\avoidance 180 processes the visual info and then sends data about obstacles to the GCS 106. An example might be seeing an obstacle five meters in front on the left or something, and send this to the GCS 106 which processes that and controls flight of the UAV 104. This include controlling how it may go around or over or otherwise avoid that obstacle.

In performing obstacle detection, shadows can be a challenge, as even good software can mistake a shadow for an actual physical obstacle. That's two cameras (stereo cameras FIG. 2) that form a 3D image of what's in front of the UAV 104. But that alone is not enough.

As shown in FIG. 2, the laser range finder 244 is located in the Sensor hub 132. Range Finder is an off shelf sensor that used for calculations for the flight of the UAV 104. Giving a distance looking down from the drone to the ground. Didn't develop the range finder itself, but the software that drives it is proprietary, and was developed using e.g. Visual Basic 6. The data to the ground control station 106 uses it for flight planning or flight.

Potential Business Models

As shown at least within FIG. 2, a human operates the system 100 through the tablet 107, but the laptop connected to the ground control station 106 is more likely operated by a data analyst or a geophysicist. During actual operation, the two places a human might touch the system 100 are at the tablet 107, and perhaps taking a USB out of the GSC 106. This is shown in FIG. 2. These would likely be two different humans with two different intentions.

Accordingly, one potential business model is to sell the system 100 outright, in a turnkey mode, and let that purchaser do all their own operations. Another potential business model is for Applicant to offer UXO-detection services to a third party purchaser, where Applicant sets up the system 100, does exploration, and then gives a carefully formatted volume of UXO data to that third party purchaser on a USB.

A user hired him to go do a job, go review a site and look for things. Go look for UXO. That user only uses the tablet 107. Someone else reviews the findings, obtains them from the GCS 106 via e.g. USB stick, or other. As shown in FIG. 2 this could be two completely different people.

The GCS 106 control logic talks to the phone app 109. Customers don't need to do any setup. Just have a GCS 106, turn it on, have a tablet 107, automatically connects to the next GCS 106.

Figures 13A, 13B:
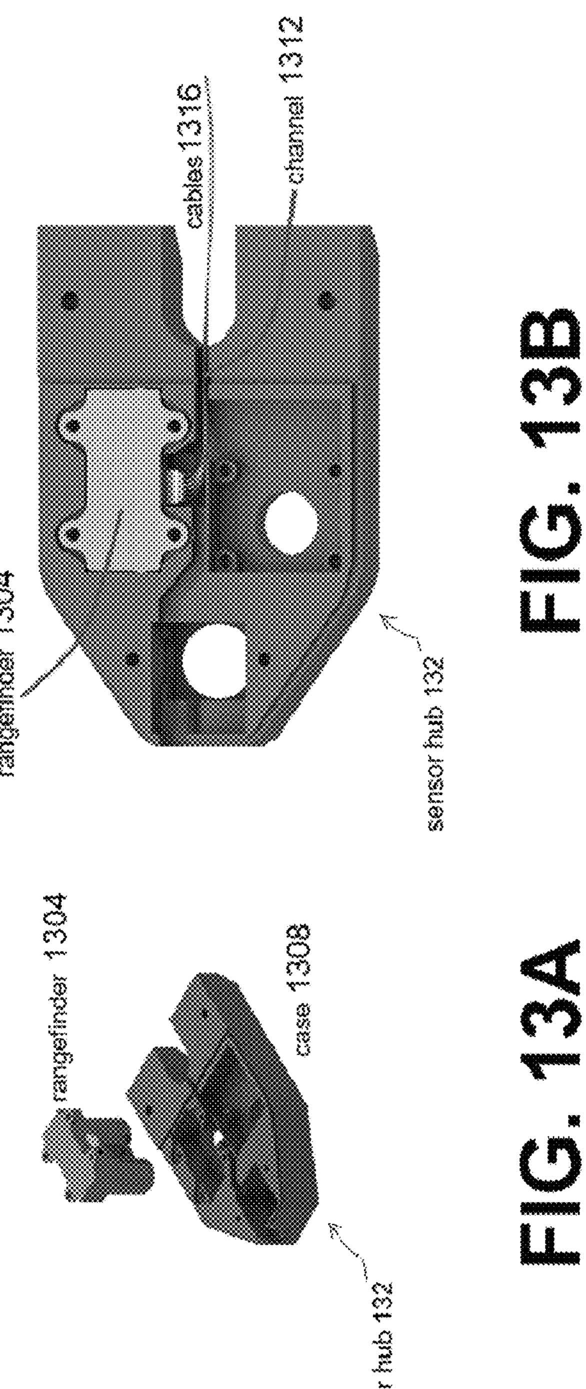
FIGS. 13A-13B-13C show an example sensor hub.
Figure 13C:
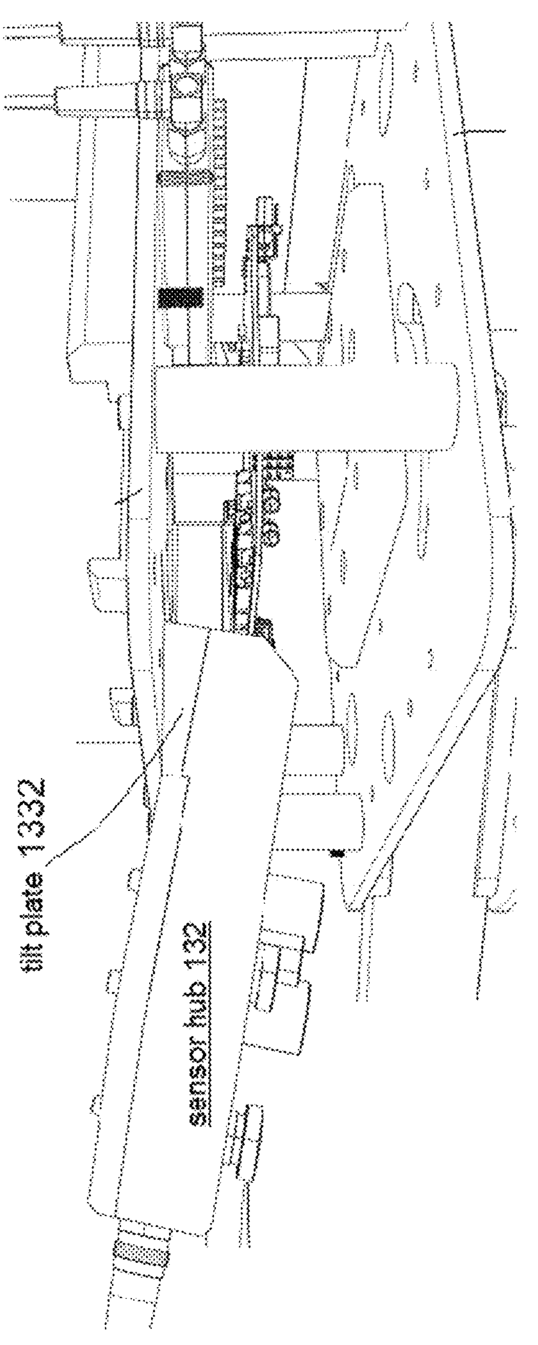

An example sensor hub 132 is shown in FIGS. 13A-C, and contains mounting locations for the rangefinder as well as other locations to mount other cameras and sensors. The sensor hub 132 is designed to mount on the front of the UAV 104 at an angle so that it can "see" ahead of the UAV 104 and adjust its altitude according to terrain. The assembly consists of the case 1308, lid, and tiltplate 1332 (FIG. 13C) to angle the case.

First the rangefinder and other electronics e.g. a camera equipped with e.g. shape-recognition software such as e.g. UXO\IED\EROW shapes need to be assembled into the sensor hub 132. It is understood that the desired UXO shapes change constantly as warfare changes. Accordingly, the system 100 works from a preconfigured shape-library which is continually updated over time. As shown in FIGS. 13A and 13B, the rangefinder 1304 fits within the case 1308 with a channel 1312 for various cables 1316 to pass through.

FIG. 13C shows how the sensor hub 132 is mounted to the front of the UAV 104. The sensor hub 132 uses the tilt plate 1332 for angling it so that the rangefinder always looks a bit ahead of the UAV 104. As shown in FIG. 13C, the sensor hub 132 is mounted to the underside of a top plate on the front of the UAV 104.

DISCLAIMER

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations, or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

What is claimed is:

1. A method of structuring and configuring a system for detecting unexploded ordnance (UXO), comprising:

configuring a ground control system (GCS) to work with a pre-configured unmanned aerial vehicle (UAV), the UAV comprising a flight controller, a metal detector, and a sensor hub;

configuring a tablet with a mobile app loaded thereupon for facilitating human usage of the GCS;

the GCS assisting a user in defining one or more land boundaries to be searched for UXO;

the GCS controlling a flight plan of the UAV;

all data-acquisition and data-management tasks performed by the UAV, including data and communications related to geographic data, flight plan, all terrain data obtained, and all UXO data obtained; and the GCS controlling the UAV using a specific predetermined methodology of obtaining UXO information available in the user-defined land-boundary;

the mobile app providing GUIs for the user to plan UXO detection missions ahead of time either off-location or on-location;

the mobile app providing a GUI to select a New Mission and facilitating entry of desired plurality of mission parameters; and configuring the plurality of mission parameters comprising sensor altitude over ground, and lane spacing;

combining metal detector data with position data from the UAV at the time the reading was taken;

factoring that both GPS receiver and metal detector have different delays from the point a measurement is taken until received at the GCS;

a metal detector controller operating and updating the metal detector;

configuring the metal detector controller with predetermined logic for interpreting the differing delays and aligning them; and fusing/combining the UXO and terrain data and combining position data with metal detector data;

equipping the UAV with one or more stereo vision cameras for calculating a depth of field;

the two cameras performing obstacle detection partly by forming a 3D image of what is in front of the UAV and conveying that information to an obstacle detection and avoidance module;

the obstacle detection and avoidance module processing visual information;

the obstacle detection and avoidance module sending data about obstacles to the GCS including how the UAV may avoid that obstacle;

the GCS then directing a travel path of the UAV and the UAV not being self-directed;

the obstacle detection and avoidance module utilizing information obtained from the sensor hub.

2. The method of claim 1, further comprising:

configuring the UAV to coordinate signals and electrical flow between the metal detector and the flight controller (FC), an RFD modem, a remote control (RC) receiver, a position-location unit, a front sensor hub, and a main battery.

3. The method of claim 2, further comprising:

planning out a UXO-detection mission using the mobile app located on the tablet;

the UAV autonomously executing a flight plan and simultaneously storing UXO data collected by the metal detector;

wherein executing a flight plan includes following a ground contour and simultaneously flagging UXO information;

after that mission is completed, the UAV flying back to a predetermined (but changeable) “home” location and lands (verb); and at completion of the mission, automatically transferring all UXO and other mission data to a storage device attached to the GCS.

4. The method of claim 2, further comprising:

the GCS controlling flight of the UAV while communicating with the tablet app and also while analyzing and mapping UXO data;

the GCS constantly controlling UAV-flight in real-time;

the UAV stabilizing itself and, when appropriate, flying to a predetermined Global Positioning System (GPS) location;

the GCS providing thrust and tilt angle commands to the UAV;

the GCS controlling a payload within the UAV, the payload comprising the metal detector, camera, and GPS; and the GCS receiving all sensor data from the UAV in real-time and factoring all collected information as a basis for navigation decisions.

5. The method of claim 1, further comprising:
locating the laser range finder within the sensor hub;
the sensor hub maintaining a stable distance of UAV from ground utilizing sensor data from the sensor hub, thereby increasing accuracy of the metal detector; and
the UAV, utilizing sensor information from the sensor hub and laser rangefinder managed by the GCS, following real word terrain and avoiding obstacles in its flight path.

6. The method of claim 5, further comprising:
storing pre-configured logic within the metal detector controller on customized hardware platform;
configuring the customized hardware platform from an ATMEGA328 on a predetermined type of PCB.

7. The method of claim 6, further comprising:
the metal detector controller setting predetermined operating conditions for the metal detector;
reading and processing an output from the metal detector and converting the output into a MAVLINK-compatible message; and
sending the MAVLINK-compatible message to the flight controller (FC) which relays it to the GCS.

8. The method of claim 7, further comprising:
the GCS sending serial messages to the metal detector controller in a predetermined order and predetermined timing for configuring the metal detector;
the metal detector controller emitting serial data messages that are buffered, split, and analyzed by the GCS; and
a control box creating timestamps that are added to the averaging-data and the system using the timestamps synchronize data from various sources comprising the metal detector, and GPS.

9. The method of claim 8, further comprising:
the metal detector providing 4 wireless data channels comprising scaling factor, timestamp, TX current, and detector supply voltage; and
the metal detector sending databytes at a predetermined frequency to the FC which relays it to the GCS; and
the GCS taking apart the databytes from the metal detector for further processing.

10. The method of claim 9, further comprising:
if the metal detector data flow stops for any reason, a set of pre-configured logic automatically reinitializes the metal detector after a timeout.

11. The method of claim 1, further comprising:
mounting/configuring the sensor hub onto the front of the UAV at an angle so that during movement of the UAV the sensor hub is seeing ahead of the UAV and communicating with the GCS to adjust its altitude according to terrain.

12. The method of claim 11, further comprising:
the system comparing image-data from the stereo cameras with a preconfigured library of UXO shapes which is continually updated over time.

13. The method of claim 12, further comprising:
the obstacle detection and avoidance module automatically compensating for camera and sensors having varying levels of elevation, ground obstacles, tilt angles, distances, and ground contours.

* * * * *